United States Patent
Kim et al.

(10) Patent No.: US 10,425,211 B2
(45) Date of Patent: *Sep. 24, 2019

(54) METHOD FOR MEASURING AND REPORTING CHANNEL STATE IN WIRELESS ACCESS SYSTEM SUPPORTING UNLICENSED BAND

(71) Applicant: LG ELECTRONICS INC., Seoul (KR)

(72) Inventors: Seonwook Kim, Seoul (KR); Hanbyul Seo, Seoul (KR); Kijun Kim, Seoul (KR); Jonghyun Park, Seoul (KR); Joonkui Ahn, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

This patent is subject to a terminal disclaimer.

(21) Appl. No.: 15/506,206

(22) PCT Filed: Sep. 1, 2015

(86) PCT No.: PCT/KR2015/009167
§ 371 (c)(1),
(2) Date: Feb. 23, 2017

(87) PCT Pub. No.: WO2016/036097
PCT Pub. Date: Mar. 10, 2016

(65) Prior Publication Data
US 2018/0227106 A1 Aug. 9, 2018

Related U.S. Application Data

(60) Provisional application No. 62/044,400, filed on Sep. 1, 2014.

(51) Int. Cl.
*H04L 5/00* (2006.01)
*H04B 7/06* (2006.01)
(Continued)

(52) U.S. Cl.
CPC .......... *H04L 5/0057* (2013.01); *H04B 7/0626* (2013.01); *H04L 1/00* (2013.01);
(Continued)

(58) Field of Classification Search
CPC .......... H04W 72/1289; H04W 74/006; H04W 74/04
See application file for complete search history.

(56) References Cited

U.S. PATENT DOCUMENTS 8,483,105 B2 * 7/2013 Nanda ............... H04L 29/06068
370/278
8,767,570 B2 * 7/2014 Ong .................. H04W 74/0816
370/252

(Continued)

FOREIGN PATENT DOCUMENTS

EP 2696530 2/2014
WO 2014119888 8/2014

OTHER PUBLICATIONS

PCT International Application No. PCT/KR2015/009167, Written Opinion of the International Searching Authority dated Dec. 14, 2015, 14 pages.

*Primary Examiner* — Alpus Hsu
(74) *Attorney, Agent, or Firm* — Lee Hong Degerman Kang Waimey

(57) ABSTRACT

A wireless access system supporting an unlicensed band and, more particularly, to a method for measuring a channel state and an apparatus for supporting the same. As one embodiment of the present invention, a method for reporting channel state information (CSI) in a wireless access system supporting an unlicensed band may comprise the steps of: receiving an upper layer signal including channel state information-reference signal (CSI-RS) configuration information and channel state information-interference measurement (CSI-IM) configuration information for one or more transmission points (TP) included in a transmission oppor- (Continued)

tunity (TxOP) duration; receiving a physical layer signal including TxOP configuration information that indicates which TP is included in the TxOP duration; measuring the CSI by using a CSI-RS resource and a CSI-IM resource for the TP indicated by the TxOP configuration information, on the basis of the CSI-RS configuration information and the CSI-IM configuration information; and reporting the measured CSI.

10 Claims, 17 Drawing Sheets

(51) Int. Cl.
| | | |
|---|---|---|
| *H04W 72/12* | (2009.01) | |
| *H04W 74/04* | (2009.01) | |
| *H04L 1/00* | (2006.01) | |
| *H04B 7/024* | (2017.01) | |
| *H04W 16/14* | (2009.01) | |
| *H04W 74/00* | (2009.01) | |
| *H04L 27/00* | (2006.01) | |

(52) U.S. Cl.
CPC .......... *H04L 1/0026* (2013.01); *H04L 1/0027* (2013.01); *H04L 5/0048* (2013.01); *H04W 72/1289* (2013.01); *H04W 74/04* (2013.01); *H04B 7/024* (2013.01); *H04L 5/001* (2013.01); *H04L 5/0035* (2013.01); *H04L 27/0006* (2013.01); *H04W 16/14* (2013.01); *H04W 74/006* (2013.01)

(56) References Cited

U.S. PATENT DOCUMENTS

| | | | | |
|---|---|---|---|---|
| 9,154,251 | B2 * | 10/2015 | Etemad | H04W 4/90 |
| 9,306,725 | B2 * | 4/2016 | Papasakellariou | H04L 5/1469 |
| 9,337,970 | B2 * | 5/2016 | Hammarwall | H04L 1/0026 |
| 9,351,288 | B2 * | 5/2016 | Pi | H04W 72/0413 |
| 9,356,724 | B2 * | 5/2016 | Etemad | H04W 4/90 |
| 9,456,372 | B2 * | 9/2016 | Lee | H04L 25/0226 |
| 9,503,240 | B2 * | 11/2016 | Kim | H04W 72/005 |
| 9,681,425 | B2 * | 6/2017 | Geirhofer | H04B 7/0621 |
| 9,749,991 | B2 * | 8/2017 | Guo | H04W 72/0413 |
| 9,807,763 | B2 * | 10/2017 | Song | H04L 1/0026 |
| 9,819,471 | B2 * | 11/2017 | Chen | H04L 5/0053 |
| 9,866,302 | B2 * | 1/2018 | Mazzarese | H04B 7/04 |
| 9,876,623 | B2 * | 1/2018 | Papasakellariou | H04L 5/0057 |
| 10,003,448 | B2 * | 6/2018 | Lee | H04L 5/0048 |
| 10,014,912 | B2 * | 7/2018 | Li | H04B 7/024 |
| 10,122,480 | B2 * | 11/2018 | Kim | H04L 5/001 |
| 2014/0003387 | A1 | 1/2014 | Lee et al. | |
| 2014/0036881 | A1 | 2/2014 | Kim et al. | |
| 2014/0086176 | A1 * | 3/2014 | Liu | H04W 74/006 370/329 |
| 2014/0126402 | A1 | 5/2014 | Nam et al. | |
| 2016/0135070 | A1 * | 5/2016 | Lee | H04L 5/0053 370/252 |
| 2016/0227428 | A1 * | 8/2016 | Novlan | H04W 24/10 |
| 2016/0301505 | A1 * | 10/2016 | Furuskog | H04W 72/00 |
| 2017/0063479 | A1 * | 3/2017 | Kim | H04W 24/10 |

* cited by examiner

FIG. 9
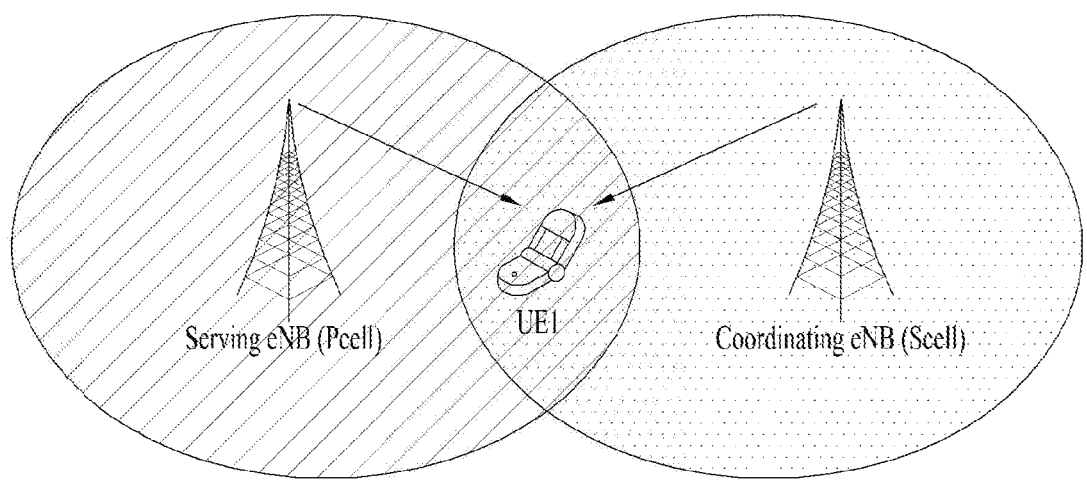
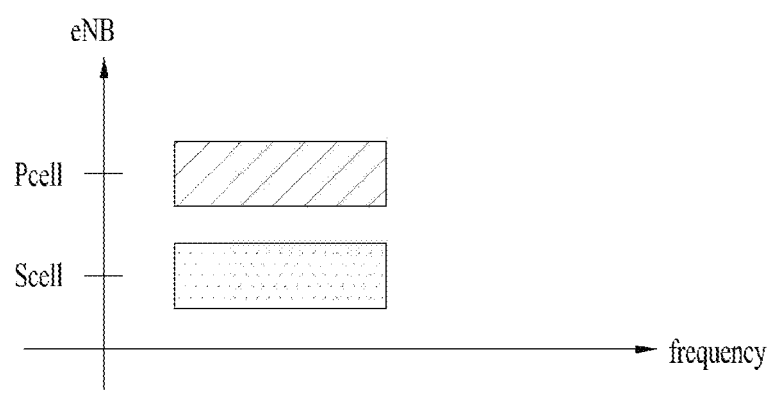

p : CRS for antenna port p (p∈0, p∈0,1 or p∈0,1,2,3)

FIG. 15
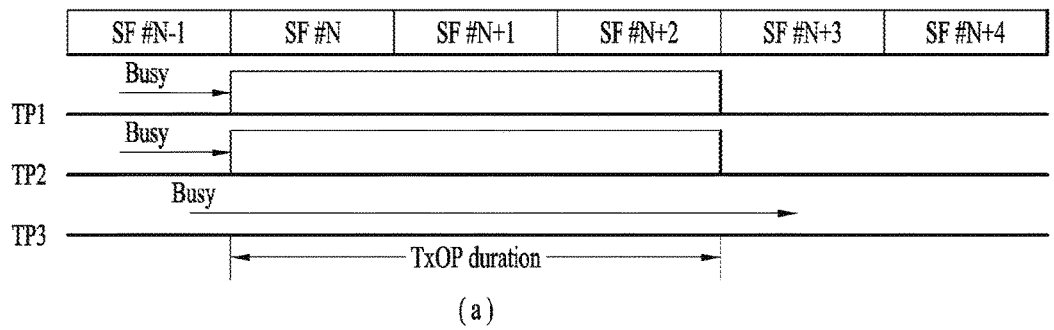
(a)
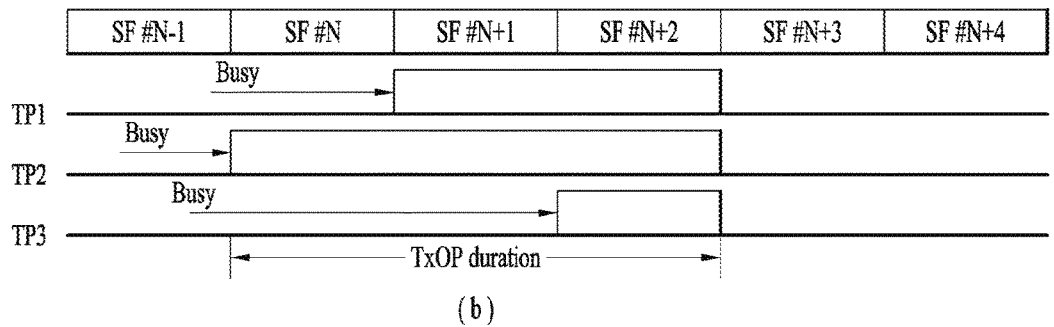
(b)
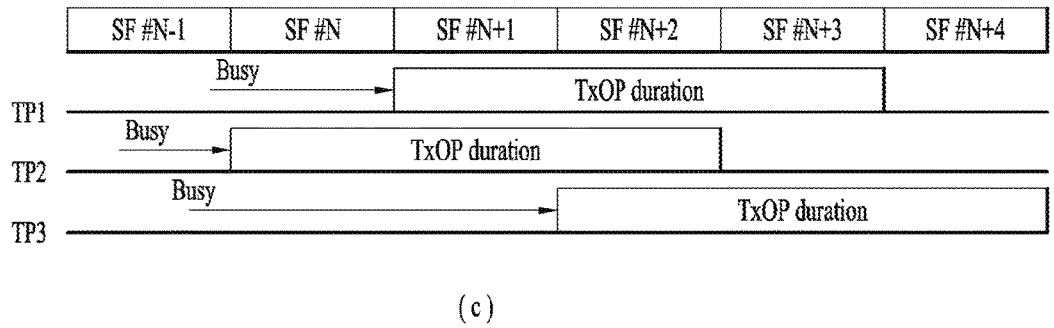
(c)

METHOD FOR MEASURING AND REPORTING CHANNEL STATE IN WIRELESS ACCESS SYSTEM SUPPORTING UNLICENSED BAND

CROSS-REFERENCE TO RELATED APPLICATIONS

This application is the National Stage filing under 35 U.S.C. 371 of International Application No. PCT/KR2015/009167, filed on Sep. 1, 2015, which claims the benefit of U.S. Provisional Application No. 62/044,400, filed on Sep. 1, 2014, the contents of which are all hereby incorporated by reference herein in their entirety.

TECHNICAL FIELD

The present invention relates to a wireless access system supporting an unlicensed band, and to a method for measuring a channel state and a device supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method for efficiently transmitting and receiving data in a wireless access system supporting an unlicensed band.

One object of the present invention is to provide methods for configuring a transmission opportunity (TxOP) duration in accordance with downlink transmission of TPs included in a CoMP set.

Another object of the present invention is to provide a method for configuring a CSI-RS, a method for configuring CSI-IM, and a method for configuring a CSI process.

Still another object of the present invention is to provide a method for indicating validity of CSI-RS configuration, CSI-IM configuration, and/or CSI process configuration by transmitting a preamble, which includes different preamble sequences, from TPs which belong to a CoMP set.

Further still another object of the present invention is to provide devices for supporting the methods.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention relates to a wireless access system supporting an unlicensed band, and provides a method for measuring a channel state and a device for supporting the same.

In one aspect of the present invention, a method for reporting channel state information (CSI) in a wireless access system supporting an unlicensed band comprises the steps of receiving a higher layer signal including channel state information-reference signal (CSI-RS) configuration information and channel state information-interference measurement (CSI-IM) configuration information for one or more transmission points (TPs) included in a transmission opportunity (TxOP) duration; receiving a physical layer signal including TxOP configuration information that indicates which TP is included in the TxOP duration; measuring the CSI by using a CSI-RS resource and a CSI-IM resource for the TP indicated by the TxOP configuration information, on the basis of the CSI-RS configuration information and the CSI-IM configuration information; and reporting the measured CSI.

In another aspect of the present invention, a UE for reporting channel state information (CSI) in a wireless access system supporting an un unlicensed band comprises a transmitter; a receiver; and a processor functionally connected with the transmitter and the receiver and configured to measure and report the CSI.

In this case, the processor may be configured to receive a higher layer signal including channel state information-reference signal (CSI-RS) configuration information and channel state information-interference measurement (CSI-IM) configuration information for one or more transmission points (TPs) included in a transmission opportunity (TxOP) duration by controlling the receiver, receive a physical layer signal including TxOP configuration information that indicates which TP is included in the TxOP duration, measure the CSI by using a CSI-RS resource and a CSI-IM resource for the TP indicated by the TxOP configuration information, on the basis of the CSI-RS configuration information and the CSI-IM configuration information, and report the measured CSI.

In the above aspects, the CSI-RS configuration information may include information for scheduling the CSI-RS resource, and the CSI-IM configuration information may include information for scheduling the CSI-IM resource.

In the above aspects, the TxOP configuration information may be mapped into the CSI-RS configuration information and/or the CSI-IM configuration information to indicate validity or invalidity of the CSI-RS configuration information and/or the CSI-IM configuration information.

In the above aspects, the physical layer signal may further include a field indicating a mapping relation between information as to whether the TxOP duration has started and the CSI-RS resource.

In the above aspects, the physical layer signal may further include a field indicating validity or invalidity of the CSI-IM resource for the TxOP duration.

In the above aspects, the higher layer signal may further include CSI process configuration information for scheduling a CSI process for the TP. At this time, the physical layer signal may indicate a feedback method when the CSI-RS resource and/or the CSI-IM resource, which configures the CSI process, is valid.

The above-described aspects of the present invention are merely some parts of the embodiments of the present invention and various embodiments into which the technical features of the present invention are incorporated can be derived and understood by persons skilled in the art from the following detailed description of the present invention.

Advantageous Effects

As is apparent from the above description, the embodiments of the present invention have the following effects.

First of all, data can efficiently be transmitted and received in a wireless access system supporting an unlicensed band.

Secondly, a TxOP duration can be configured in various forms depending on downlink transmission of TPs included in a CoMP set.

Thirdly, a UE can measure CSI for TPs, which perform DL transmission during a TxOP duration, among TPs which belong to a CoMP set, on the basis of a method for configuring a CSI-RS, a method for configuring CSI-IM, and a method for configuring a CSI process, as suggested in the present invention.

Fourthly, TPs which belong to a CoMP set may identify validity of CSI-RS configuration, CSI-IM configuration, and/or CSI process configuration during a TxOP duration even without separate signaling by transmitting a preamble, which includes different preamble sequences. Therefore, the UE may measure and report CSI on the basis of valid CSI-RS/IM resources.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

BRIEF DESCRIPTION OF THE DRAWINGS

The accompanying drawings, which are included to provide a further understanding of the disclosure, illustrate embodiments of the disclosure and together with the description serve to explain the principle of the disclosure. In the drawings:

FIG. 9 is a conceptual view of a Coordinated Multi-Point (CoMP) system operating in a CA environment;

FIG. 15 is a view illustrating a method for configuring a TxOP duration in accordance with an operation state of TPs;

BEST MODE FOR CARRYING OUT THE INVENTION

Figure 1:
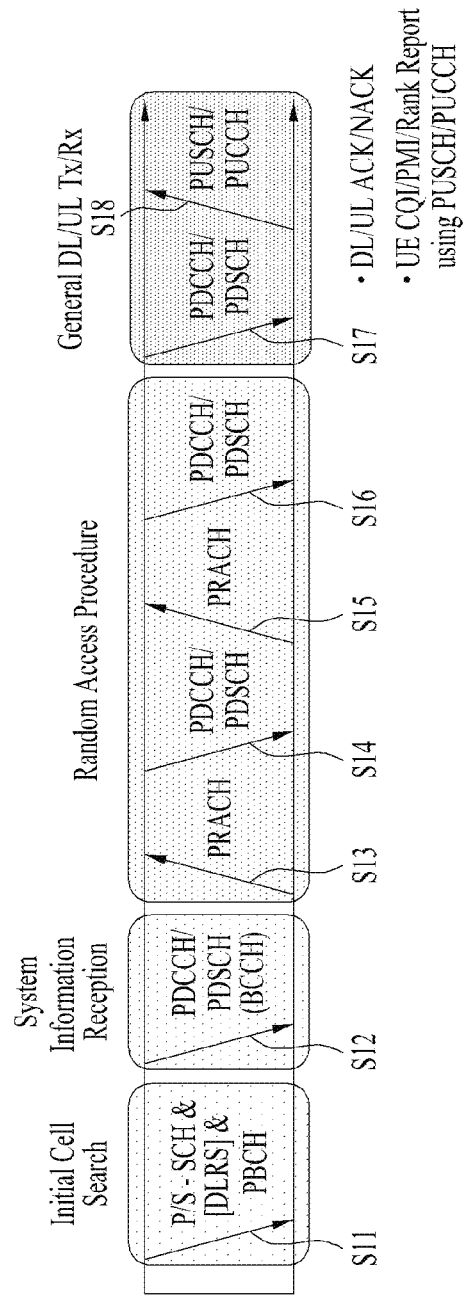
FIG. 1 is a view illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
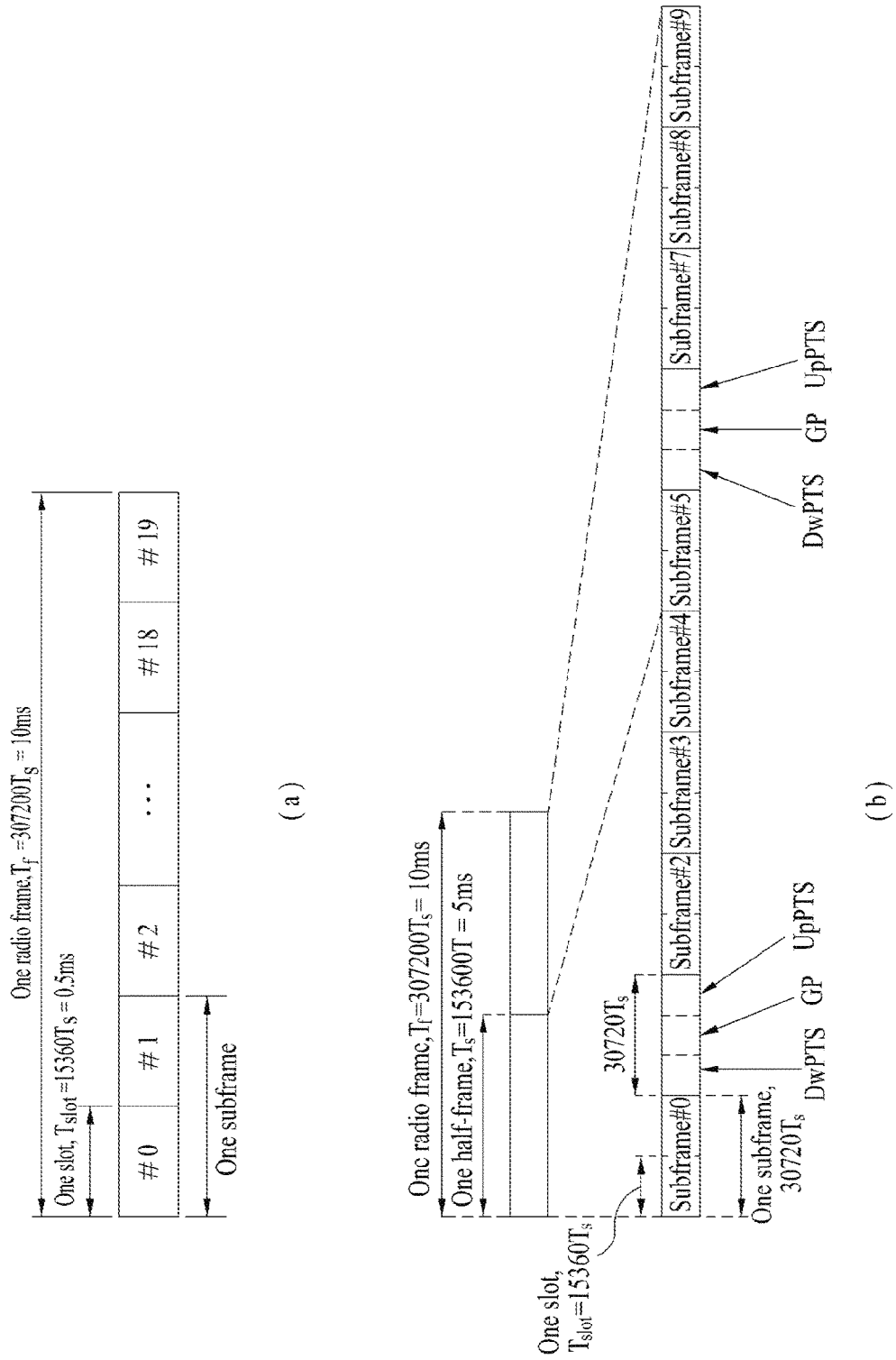
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 3:
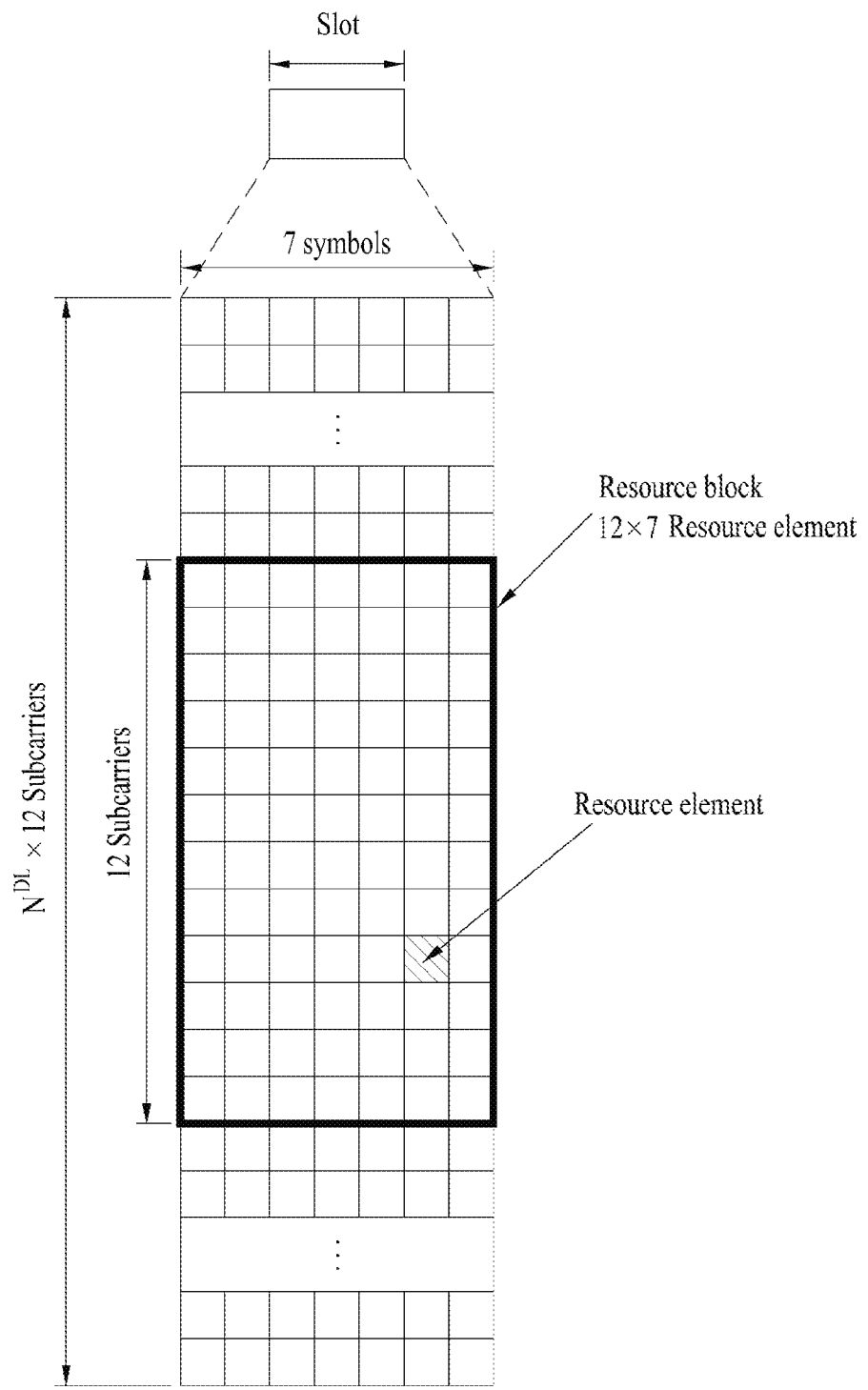
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
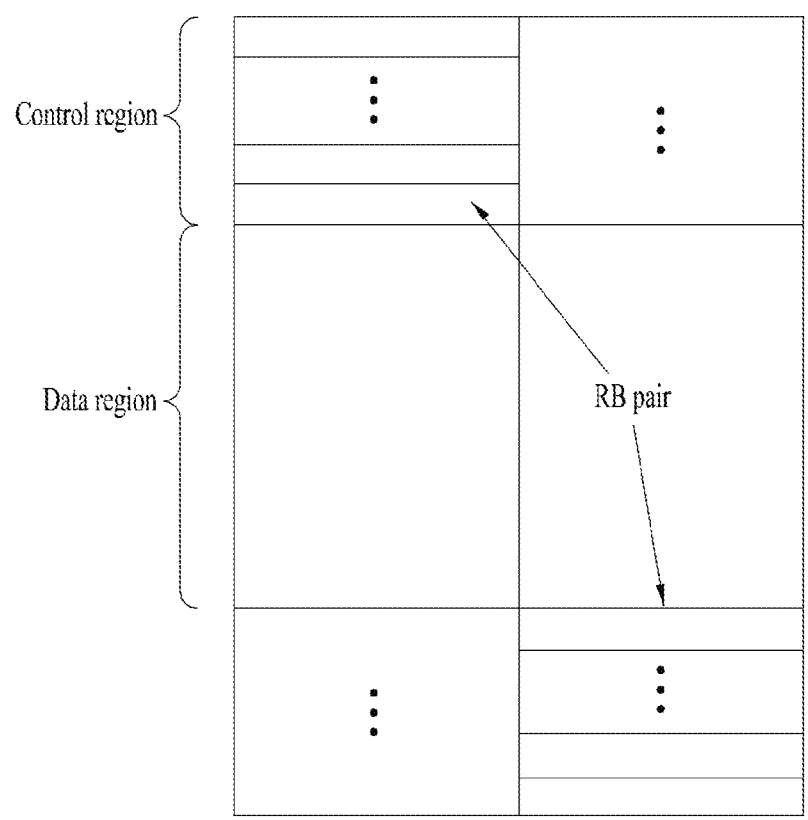
FIG. 4 is a view illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
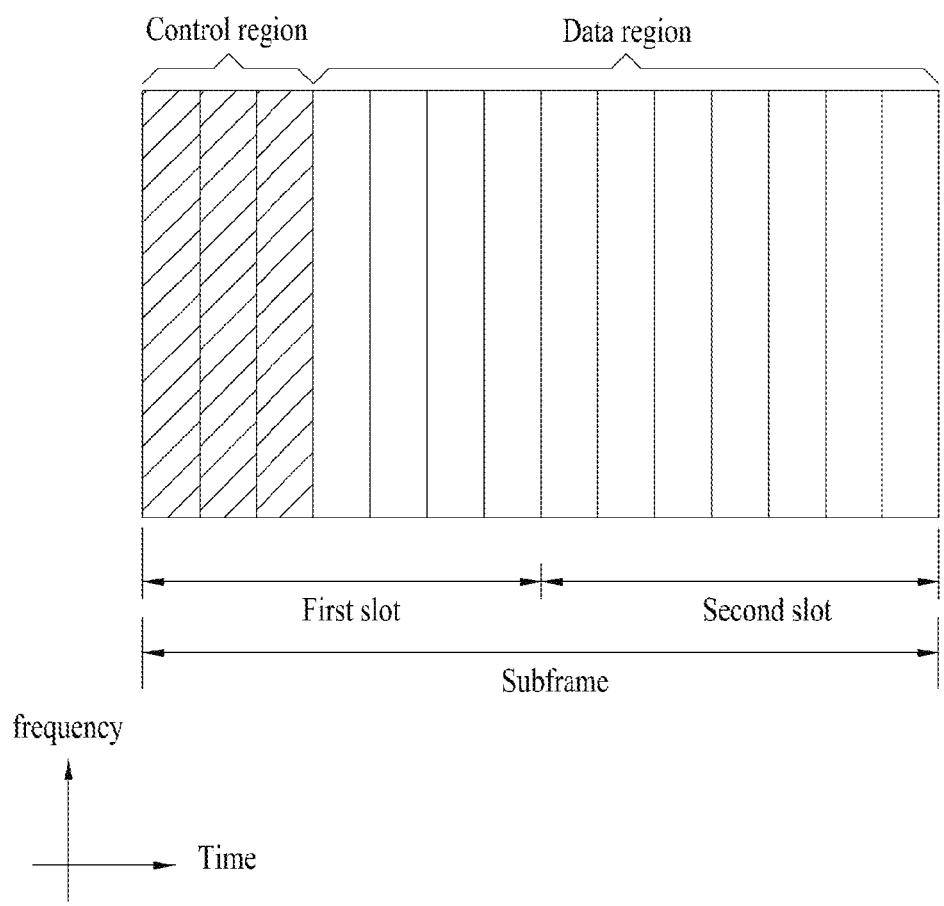
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE−1.

To simplify the decoding process of a UE, a PDCCH format including n CCEs may start with a CCE having an index equal to a multiple of n. That is, given CCE the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for PUSCH transmissions (uplink) |
| Format 1 | Resource assignments for single codeword PDSCH transmission (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g., paging/broadcast system information) |
| Format 1D | Compact resource assignments for PDSCH using multi-user MIMO(mode 5) |
| Format 2 | Resource assignments for PDSCH for closed loop MIMO operation (mode 4) |
| Format 2A | resource assignments for PDSCH for open loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH Format | Number of CCE (n) | Number of candidates in CSS | Number of candidates in USS |
| --- | --- | --- | --- |
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

Herein, $M^{(L)}$ is the number of PDCCH candidates with CCE aggregation level L to be monitored in the SS, $m=0,\ldots,M^{(L)}-1$, i is the index of a CCE in each PDCCH candidate, and $i=0,\ldots,L-1$, $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels $\{4, 8\}$ and the USS supports PDCCHs with CCE aggregation levels $\{1, 2, 4, 8\}$. [Table 5] illustrates PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

Herein, $Y_{-1}=n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths $\{1.4, 3, 5, 10, 15, \text{and } 20 \text{ MHz}\}$ and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
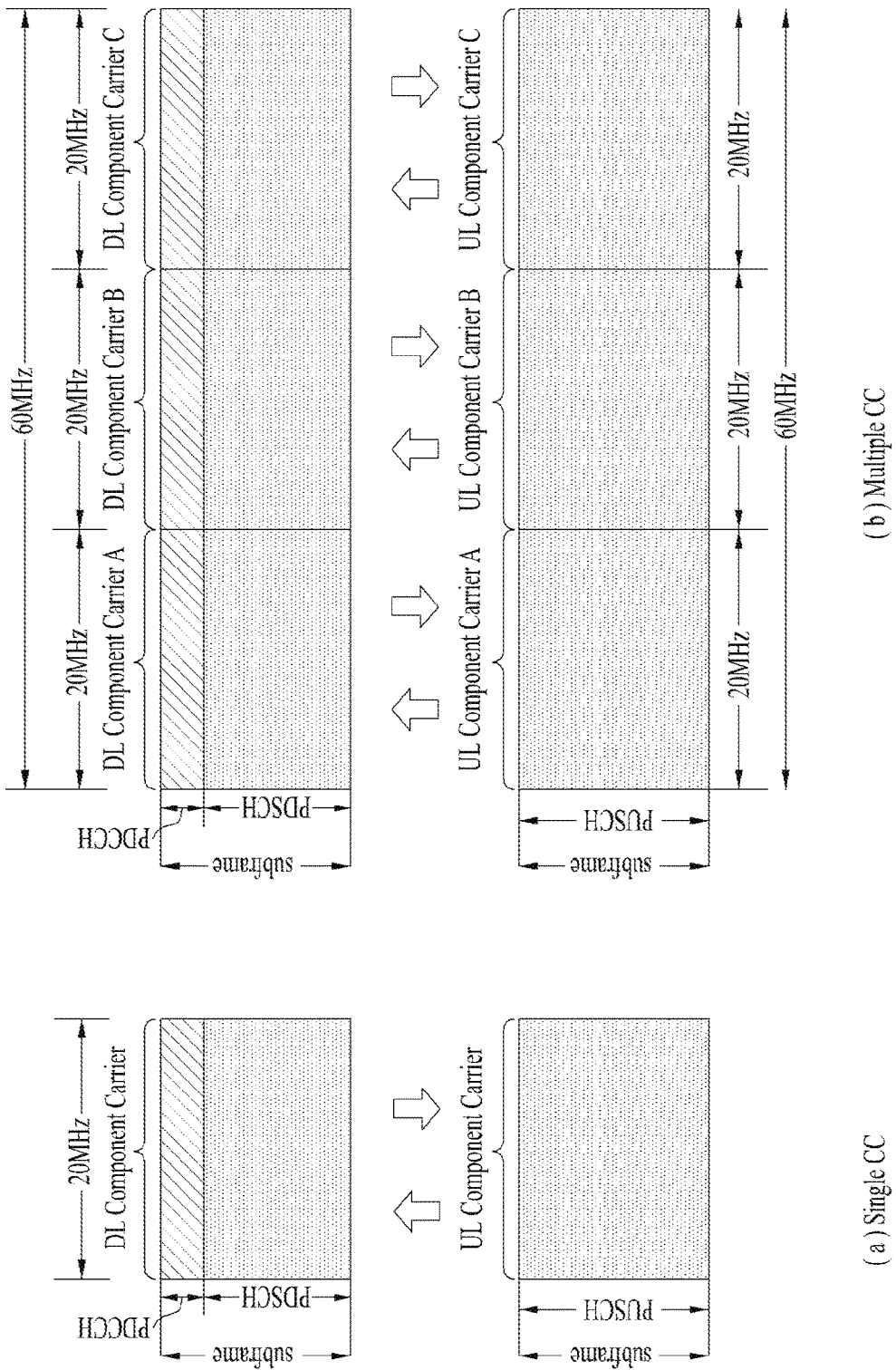
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
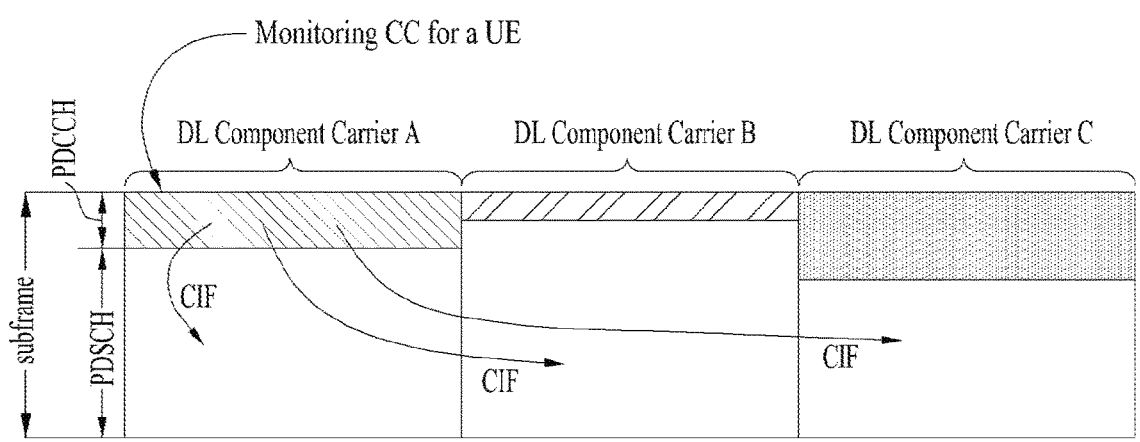
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
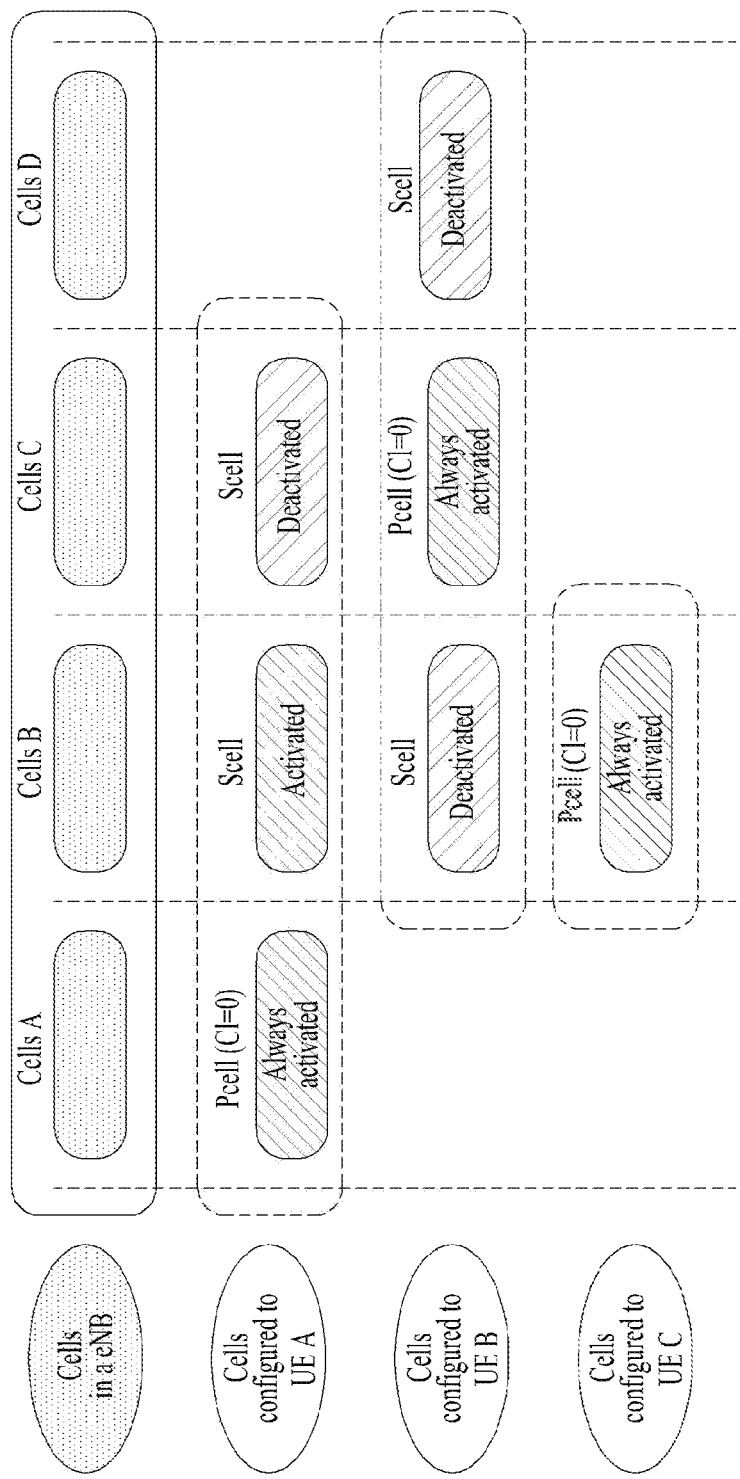
FIG. 8 is a view illustrating an exemplary serving cell configuration based on cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a carrier aggregation (CA) function in the LTE. FIG. 9 is a conceptual view illustrating a CoMP system operating based on a CA environment.

In FIG. 9, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as joint transmission (JT), CS/CB and dynamic cell selection for one UE.

FIG. 9 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.4 Reference Signal (RS)

Hereinafter, reference signals are explained, which are used for the embodiments of the present invention.

Figure 10:
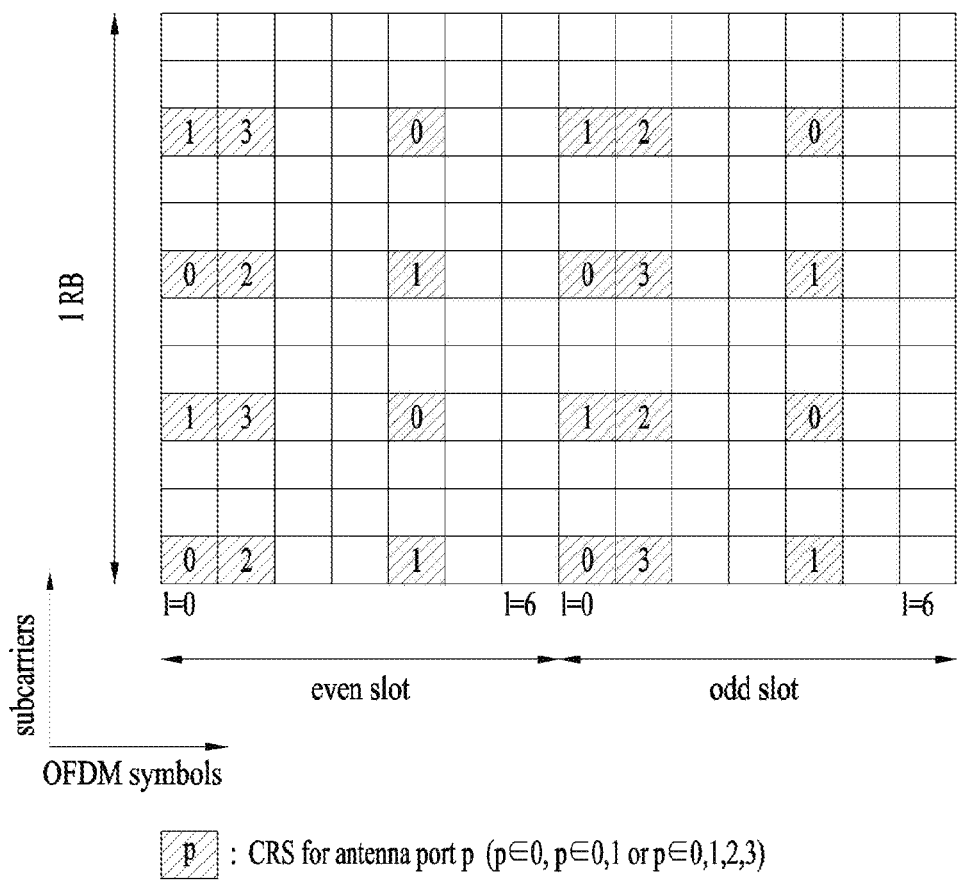
FIG. 10 is a view illustrating an example of a subframe to which a cell specific reference signal (CRS) that can be used in the embodiments of the present invention is allocated.

FIG. 10 illustrates a subframe to which cell specific reference signals (CRSs) are allocated, which may be used in embodiments of the present disclosure.

FIG. 10 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot ns.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 11:
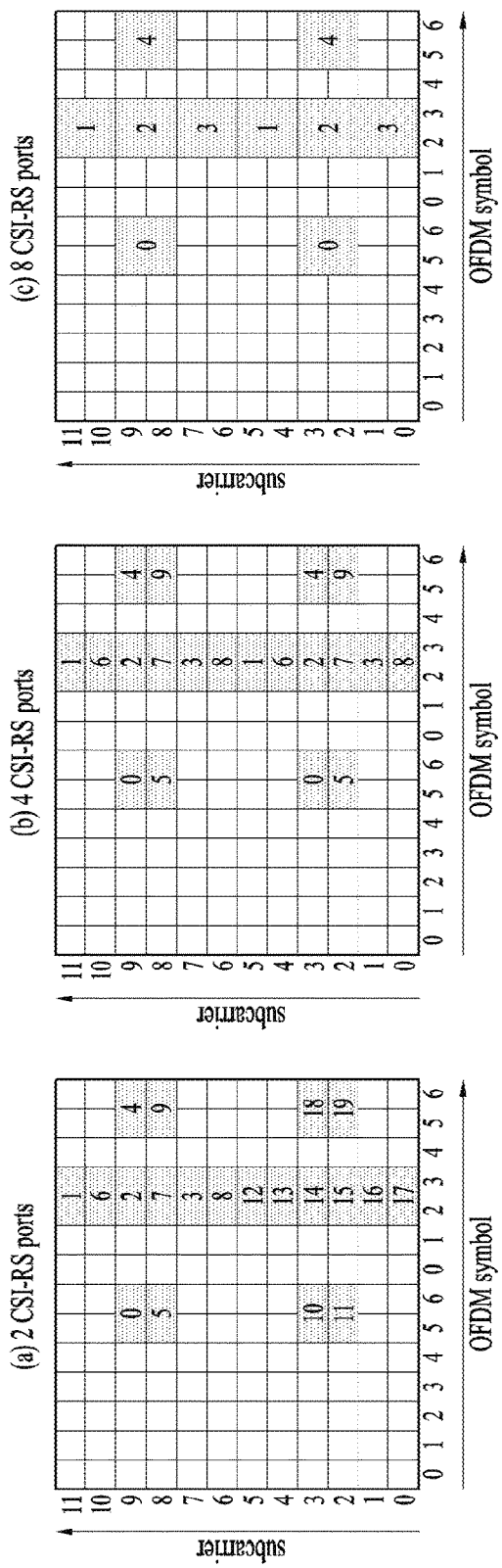
FIG. 11 is a view illustrating an example of subframes to which a CSI-RS that can be used in the embodiments of the present invention is allocated in accordance with the number of antenna ports.

FIG. 11 illustrates channel state information reference signal (CSI-RS) configurations allocated according to the number of antenna ports, which may be used in embodiments of the present disclosure.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence is mapped to complex modulation symbols used as RSs on antenna port p.

FIG. 11 (a) illustrates 20 CSI-RS configurations 0 to 19 available for CSI-RS transmission through two CSI-RS ports among the CSI-RS configurations, FIG. 11 (b) illustrates 10 available CSI-RS configurations 0 to 9 through four CSI-RS ports among the CSI-RS configurations, and FIG. 11 (c) illustrates 5 available CSI-RS configurations 0 to 4 through 8 CSI-RS ports among the CSI-RS configurations.

The CSI-RS ports refer to antenna ports configured for CSI-RS transmission. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration is assigned and (2) a CSI-RS configuration varying according to a CSI-RS configuration number, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback Pc, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 6 shows CSI-RS subframe configuration $I_{CSI-RS}$ according to $T_{CSI-RS}$ and $\Delta_{CSI-RS}$.

TABLE 6

| CSI-RS-SubframeConfig $I_{CSI-RS}$ | CSI-RS periodicity $T_{CSI-RS}$ (subframe) | CSI-RS subframe offset $\Delta_{CSI-RS}$ (subframe) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Subframes satisfying the following Equation 3 are subframes including CSI-RSs.

$(10n_f + \lfloor n_s/2 \rfloor - \Delta_{CSI-RS}) \bmod T_{CSI-RS} = 0$  [Equation 3]

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

2. 5 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a search space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 12:
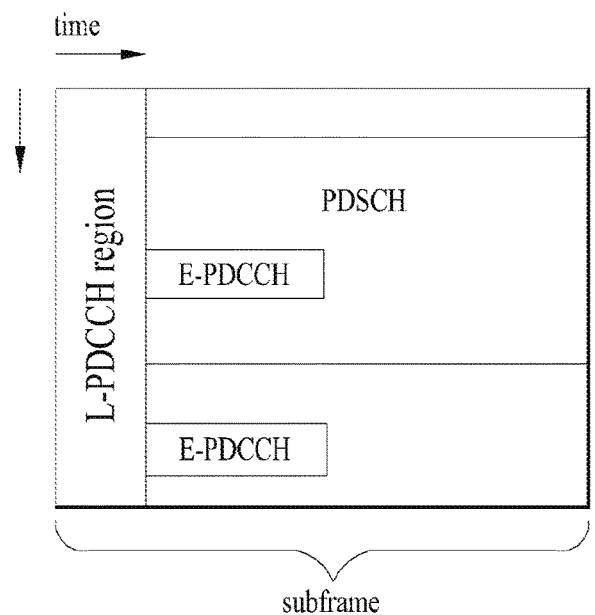
FIG. 12 is a view illustrating an example that legacy PDCCH, PDSCH and E-PDCCH, which are used in an LTE/LTE-A system, are multiplexed.

Meanwhile, in the LTE/LTE-A system, since a PDCCH which is a physical channel for DL/UL scheduling and transmitting various kinds of control information has a limitation that it is transmitted through limited OFDM symbols, enhanced PDCCH (i.e., E-PDCCH) multiplexed with a PDSCH more freely in a way of FDM/TDM may be introduced instead of a control channel such as PDCCH, which is transmitted through OFDM symbol and separated from PDSCH. FIG. 12 illustrates an example that legacy PDCCH, PDSCH and E-PDCCH, which are used in an LTE/LTE-A system, are multiplexed.

3. LTE-U System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 13:
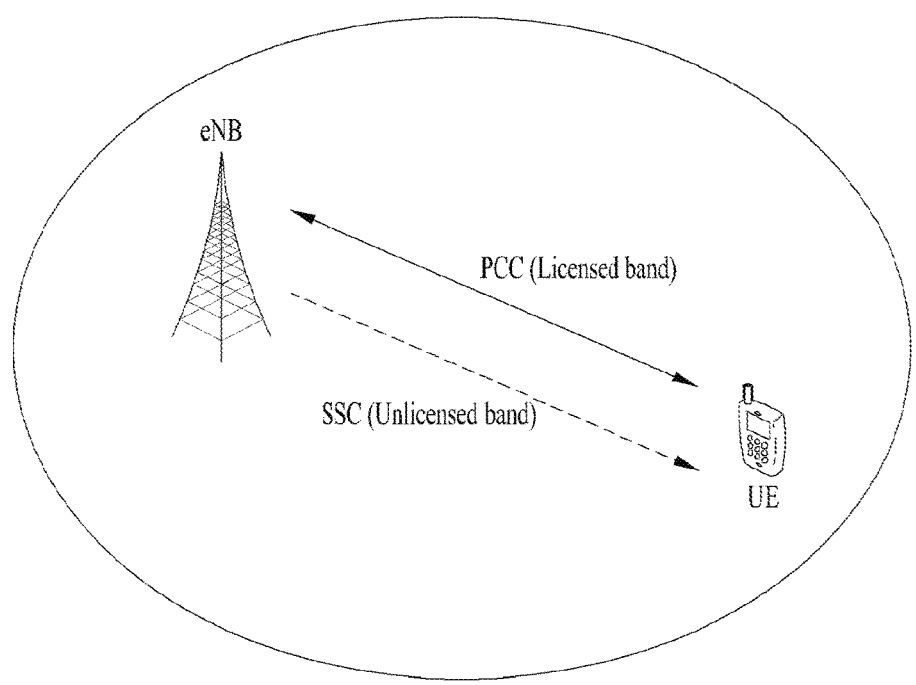
FIG. 13 is a view illustrating an example of a CA environment supported in an LTE-U system.

FIG. 13 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 13, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 13 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel. The TxOP duration comprised of M subframes may be referred to as a reserved resource period (RRP).

3.2 Method for Configuring TxOP Duration

Hereinafter, a transmission point (TP) in the embodiments of the present invention, which will be described hereinafter, may be used to refer to an eNB unless another definition or description exist. Also, RRP may be used to refer to TxOP.

Figure 14:
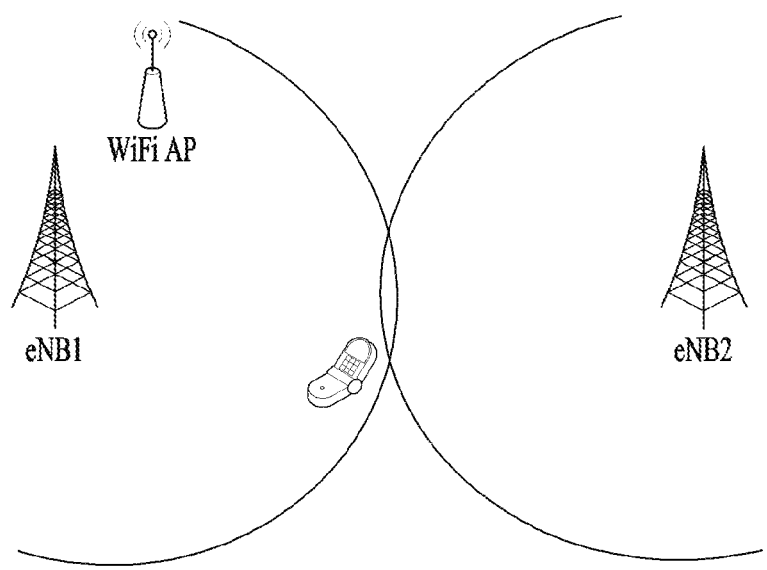
FIG. 14 is a view illustrating one of methods for supporting a CoMP operation.

FIG. 14 is a view illustrating one of methods for supporting a CoMP operation.

In case of TPs operated in the unlicensed band, CS result may be varied per TP in accordance with activity of neighboring WiFi nodes. For example, as shown in FIG. 14, a channel of TP1 (i.e., eNB1) is busy due to data transmission of a neighboring WiFi AP, whereas a channel of TP2 (i.e., eNB2) may be idle.

If there is no data to be transmitted from the TP2, a cell edge UE of the TP1 may be configured to receive data from a neighboring cell of which channel is idle even though a serving cell is busy. That is, CoMP operation may be performed by the TPs in a dynamic point selection (DPS) mode.

Or, if both channels of the TP1 and the TP2 are idle, the CoMP operation may be performed by the TP1 and the TP2 in accordance with a coordinated scheduling/beamforming (CS/CB) mode or a joint transmission (JT) mode to improve performance of the cell edge UE. At this time, the CoMP set means a TP set which will be used for the CoMP operation in view of a set of TPs, which perform the CoMP operation, or each UE. The CoMP set may be referred to as a CoMP cluster.

For CoMP set configuration, a UE should feed back channel information from neighboring TPs. To this end, the UE should measure a channel state of each TP. The UE should know a TP which joins downlink (uplink) transmission for a configured TxOP duration to perform channel measurement for TPs within the CoMP set.

In case of the CSI-RS, since it is difficult to periodically the CSI-RS in view of properties of the LTE-U system, it is preferable that the UE is aperiocially (or event triggering mode) notified of a TP that transmits the CSI-RS.

In case of the CSI-IM, with respect to an interference TP comprised of ZP-CSI-RS (Zero Power CSI-RS), different interference amounts may be measured for a case that the corresponding TP is included in TxOP and a case that the corresponding TP is not included in TxOP.

Hereinafter, a method for configuring a TxOP duration in accordance with TPs included at start timing and/or end timing of the TxOP duration among TP(s) included in the CoMP set will be suggested.

As a first method, the TxOP duration may be configured and start only if all TPs within the CoMP set can be operated. That is, the TxOP duration may be configured only in case of an active state that all TPs within the corresponding CoMP set may join CoMP transmission at an idle state.

In this case, it is advantageous that the UE may perform channel measurement in the same manner as the legacy LTE system. However, if another system (e.g., WiFi system) exists within coverage of the corresponding CoMP set, a channel state of a random TP within the CoMP set may unexpectedly be changed to a busy state due to channel reservation of another system. Therefore, another TP having data to be transmitted may fail to start downlink transmission within the corresponding TxOP duration.

As second method, the TxOP duration may be configured to set and start even though all TPs within the CoMP set cannot be operated. That is, The TxOP duration may be configured only in case of an active state that only some TPs within the corresponding CoMP set may join CoMP transmission at an idle state.

FIG. 15 is a view illustrating a method for configuring a TxOP duration in accordance with an operation state of TPs. In FIG. 15, it is assumed that the CoMP set includes TP1, TP2, and TP3, TP1 is a serving cell, and the number M of subframes, which join the TxOP duration, is M=3. At this time, it is assumed that TP1, TP2, and TP3 are operated in the unlicensed band. However, the number of TPs included in the CoMP set and the number of subframes included in the TxOP duration may be changed depending on external factors such as channel condition or cell arrangement state.

Referring to FIG. 15, the TxOP duration may be configured only if some TPs within the CoMP set can perform downlink transmission at an idle state. For example, referring to FIG. 15(a), the TxOP duration may be configured only with the TP1 and the TP2 which are idle even though a channel state of the TP3 is busy at SF#N.

In one aspect of this embodiment, if the TxOP duration starts, transmission of another TP3 (within the same CoMP set) not the TP1 and the TP2 which try transmission for the TxOP duration, may be granted or may not be granted until the corresponding TxOP duration ends.

If downlink transmission is not granted even though the TP3 becomes the idle state during the corresponding TxOP duration, start/end timing of the TxOP duration may be operated as TPs within at least the same CoMP set are synchronized with each other. For example, even though the channel of the TP3 is idle at SF #N+1 in FIG. 15(a), downlink transmission cannot start within the TxOP duration.

If the TP3 becomes the idle state during the corresponding TxOP duration and downlink transmission is granted, only end timing may be set in accordance with synchronization between TPs within the same CoMP set as shown in FIG. 15(b), or start and end timings may be set without synchronization between TPs within the same CoMP set as shown in FIG. 15(c). A separate TxOP duration may be configured for all TPs in case of FIG. 15(c).

If the TxOP duration is configured even though only some TPs within the CoMP set can try downlink transmission, it is preferable that each UE should know TPs which are transmitting data for the currently configured TxOP duration and regard only CSI-RS and CSI-IM associated with the corresponding TP(s) as valid measurement targets.

In case of FIG. 15(a), the TP1 which is a serving cell may transmit information as to TPs which join downlink data transmission for the TxOP duration, to the UE at SF#N. In case of FIGS. 15(b) and 15(c), since the start timings of the TxOP durations of the respective TPs are different from each other, the UE should be notified of information as to a TP, which joins downlink transmission during the corresponding TxOP duration, whenever there is a change in TPs which join downlink transmission during the TxOP duration. For example, at SF#N, the UE may be notified of only TP2 which joins downlink transmission, at SF#N+1, the UE may be notified of only TP1 and TP2 which join downlink transmission, and at SF#N+2, the UE may be notified of all TPs which join downlink transmission. At this time, it is assumed that the serving cell (i.e., TP1) notifies the UE of corresponding TPs which join downlink transmission.

3.3 Method for Measuring and Reporting CSI in LTE-U System

Hereinafter, methods for measuring and reporting CSI for TPs included in a CoMP set in an LTE-U system will be described. To this end, methods for configuring CSI-RS, CSI-IM and CSI process for TPs included in a TxOP duration and transmitting information thereof and methods for transmitting information on TPs included in the TxOP duration will be described. In the embodiments of the present invention, the expression that 'TP(s) is(are) included in TxOP' means that TP(s), which perform DL transmission within the TxOP duration, among TPs within a configured CoMP set.

For efficient CoMP operation, it is preferable that a UE should feed back channel information on a plurality of TPs within the CoMP set to a serving TP. CSI feedback of each UE may be performed per designated CSI process. At this time, each CSI process may include one CSI-RS resource and one CSI-IM resource. Each UE may measure intensity and spatial properties of a received signal through the CSI-RS resource and measures intensity and spatial properties of interference through the CSI-IM resource. As a result, the UE may calculate CSI (e.g., RI, PMI, and/or CQI) of the corresponding CSI process and report the calculated result to the serving TP. Therefore, the UE should perform channel measurement at a given CSI-RS resource and CSI-IM resource to feed channel information back.

CSI-RS configuration IE (Information Element) for scheduling the CSI-RS resources includes information such as antennaPortsCount field, resourceConfig field, subframeConfig field, p-C field, zero TxPowerResourceConfigList field, and/or zeroTxPowerSubframeConfig field. This CSI-RS configuration may indicate information such as antenna ports, allocated resources (time and frequency domains), a transmission period and offset (see clause section 2.4 above).

In the LTE/LTE-A system, the CSI-RS is periodically transmitted after configuration. However, in view of the properties of the unlicensed band which is supported in the LTE-U system, since the TP may reserve and transmit data only if the channel is idle, it may be difficult to periodically transmit the CSI-RS. For example, in the LTE-U system, only TPs, which configure the TxOP duration by determining that the corresponding channel is idle, may transmit the CSI-RS. That is, each UE should know when the TxOP duration starts and/or ends. Also, each UE should know TPs which actually transmit DL data within the configured TxOP duration, whereby measurement for the corresponding CSI-RS may be performed exactly.

CSI-IM configuration IE includes information such as resourceConfig field and/or subframeConfig field, and may include resource allocation information on CSI-IM, such as resources (that is, location of RE) of time and frequency domains which are used, a transmission period and offset. Each UE may assume that all signals received from CSI-IM designated for CSI report are interferences and measure the amount of interference by performing channel measurement at the designated CSI-IM only, on the basis of the CSI-IM configuration IE.

Some of interference TPs in the CSI-IM resource region may be configured to perform muting. That is, the TP may configure a ZP-CSI-RS. Alternatively, some of the interference TPs may be configured so as not to perform muting. For example, ZP-CSI-RS may not be configured and PDSCH may be mapped to a corresponding RE.

Also, unlike the LTE/LTE-A system, the TP may reserve a channel, which is idle, in view of properties of the LTE-U system operated in the unlicensed band. Therefore, the interference TP(s) may be included in TxOP or not depending on whether the channel is idle.

In another aspect of the present invention, it is assumed that interference TP(s) configure(s) a ZP-CSI-RS in view of a specific TP. If the corresponding TP is included in TxOP, CSI having no interference of the corresponding TP may be measured. However, if the corresponding TP is not included in TxOP (for example, because of a busy channel), interference is measured by another system (for example, WiFi system) in the periphery of the corresponding TP, whereby CSI which is not good may be measured unintentionally.

At this time, a specific TP transmits a PDSCH on the basis of lowerly measured CSI feedback in a state that the corresponding interference TP is included in TxOP and configures a ZP-CSI-RS, the PDSCH is transmitted based on CSI feedback which is underestimated, whereby inefficient downlink service may be provided. Therefore, each UE needs to know TPs which are performing transmission for a currently configured TxOP even in performing channel measurement for CSI-IM.

Additionally, even though a channel of a specific TP is idle, the corresponding TP may not try transmission for the TxOP duration because there is no data to be transmitted. In this case, since interference the same as the case that the corresponding TP is included in the TxOP duration may be measured, information on traffic on/off, which indicates whether there is downlink data to be transmitted from each TP, may be required in addition to information on TP included in TxOP.

Also, even in a state that interference TP(s) do(es) not configure a ZP-CSI-RS in view of a specific TP, it is preferable that each UE knows TPs included in the currently configured TxOP. With respect to the CSI-IM resource region, if the interference TP(s) is(are) included in TxOP, interference of the corresponding TPs may be measured, and if the interference TP(s) is(are) not included in TxOP, unexpected interference (for example, interference caused by WiFi signal) may be measured. This is because that wrong CSI may be measured if there is a great difference between interference caused by neighboring TPs and interference caused by WiFi signal.

Therefore, methods for notifying a UE of a TP which is transmitting data for a TxOP duration and a method for performing channel measurement for CSI-RS and CSI-IM for a specific TxOP duration will be suggested hereinafter.

3.3.1 Method for Transmitting TxOP Configuration Information

First of all, a method for transmitting TxOP configuration information will be described. The TxOP configuration information may be transmitted using DCI transmitted through (E)PDCCH allocated to a subframe of a PCell. Alternatively, the TxOP configuration information may be transmitted using DCI transmitted through (E)PDCCH allocated to a subframe of an SCell. That is, the serving TP may transmit DCI, which includes TxOP configuration information, to the UE to indicate TPs which are performing downlink transmission within the TxOP duration.

For example, the serving TP may indicate TPs which are performing DL transmission in the form of bitmap. That is, the TxOP configuration information may be configured in the form of bitmap. If there is a CoMP set that includes 3 TPs, a UE, which has received a value '110' in a field (for example, TxOP configuration) designated to notify that random TPs are performing transmission, may construe that the first TP and the second TP within the CoMP set are performing transmission for TxOP.

At this time, a TP mapped into each bit of a bitmap included in the TxOP configuration information may be configured previously by higher layer signaling. The corresponding DCI may be transmitted to all UEs (or UE group) within SCell coverage through a common search space (CSS), or may be transmitted to a specific UE through UE-specific search space (USS).

For another example, the TxOP configuration information included in a DCI format may be configured by a size of 2 bits or 1 bit. At this time, TPs which are performing transmission per state of the TxOP configuration information may be configured by higher layer signaling.

It is assumed that the TxOP configuration information is configured by 1 bit. At this time, if the TxOP configuration information is set to '1', it may indicate that specific TP(s) within the CoMP set are performing transmission for the currently configured TxOP duration. If the TxOP configuration information is set to '0', it may indicate that specific TP(s) are not performing transmission for the currently configured TxOP. Even in the case that the TxOP configuration information is configured by 2 bits, the TxOP configuration information may be configured similarly.

The above-described TxOP configuration information may be transmitted at the start SF (i.e., SF#N) of the TxOP duration if synchronization is performed between TPs within the CoMP set at the start/end timing as shown in FIG. 15(a). However, the TxOP configuration information should be transmitted whenever a TP set, which configures the TxOP duration, is varied if synchronization is performed at the end timing or synchronization is not performed at the start/end timing as shown in FIG. 15(b) or FIG. 15(c). For example, in FIG. 15(b), the TxOP configuration information should be transmitted at SF #N, SF #N+1, and SF #N+2.

3.3.2 CSI-RS Configuration

Hereinafter, a CSI-RS configuration method will be described. For example, CSI-RS 1 assumes that TP1 transmits NZP CSI-RS (None Zero Power CSI-RS), CSI-RS 2 assumes that TP2 transmits NZP CSI-RS, and CSI-RS 3 assumes that TP3 transmits NZP CSI-RS. At this time, CSI-RS 1, 2 and 3 mean CSI-RS ID.

If only the TP1 and the TP2 are actually performing transmission within the TxOP duration configured as shown in FIG. 15(a) and the TPs notify the UE that the TxOP duration has started, the UE may perform channel measurement for all CSI-RS resources which are allocated. At this time, since the TP3 actually does not transmit NZP CSI-RS at a CSI-RS resource corresponding to CSI-RS 3, the TP3 may acquire wrong channel information from the corresponding CSI-RS resource. Therefore, the TP should notify the UE that the TxOP duration has started and also notify the UE of a TP which actually joins transmission within the TxOP duration.

In other words, a mapping relation between CSI-RS ID of which measurement will be performed by each UE and information as to TPs which join transmission to start the TxOP duration should be configured. At this time, CSI-RS ID indicates a CSI-RS resource allocated to a specific TP.

For example, the corresponding mapping relation may be configured based on (virtual) cell ID per TP. In the method for transmitting the TxOP configuration information described in section 3.3.1 above, the method for using a bitmap may be used. For example, if (virtual) cell ID of a TP mapped per bit is configured previously by higher layer signaling, the UE perform channel measurement at the CSI-RS resource only mapped into (virtual) cell ID of the TP set to '1' in the bitmap included in DCI.

Alternatively, even in the case that TxOP configuration information is configured in the form of 2 bits or 1 bit not the bitmap, if (virtual) cell ID of a TP which is performing transmission for TxOP duration per state is configured by higher layer signaling, the UE may perform channel measurement at the CSI-RS resource only.

However, since (virtual) cell ID may be configured equally per TP which belongs to the CoMP set, if the above method is used, ambiguity may occur in the UE operation. Therefore, the mapping relation may be configured based on the TxOP configuration information (included in a DCI format) indicating a TP which performs actual DL transmission for the TxOP duration, not based on (virtual) cell ID. For example, if the TxOP configuration information included in DCI is configured by bitmap, the UE may be configured to perform channel measurement only when the field corresponding to a corresponding bit of the bitmap per CSI-RS ID is '1'. That is, CSI-RS 1 may be configured to become a target for channel measurement only if the first bit value of the bitmap of the TxOP configuration information is '1'.

At this time, the method for mapping configuration may be notified to the UE explicitly by adding a new parameter on the CSI-RS configuration information, or may previously be prescribed that CSI-RS 1 is associated with the first bit of the bitmap of the TxOP configuration information within the corresponding DCI, CSI-RS 2 is associated with the second bit, and the CSI-RS 3 is associated with the third bit, without change of the legacy CSI-RS configuration information. This mapping method may be applied equally even in the case that the corresponding DCI field is configured by 2 bits or 1 bit not the bitmap.

As another method, the serving TP may directly notify the UE of an NZP-CSI-RS set activated at a start SF of the TxOP duration. That is, the TP may directly notify the UE of an NZP-CSI-RS set, which is a measurement target, without mapping relation between CSI-RS ID of which measurement will be performed by each UE and information as to TPs which join transmission to start the TxOP duration.

For example, a new field may be added to DCI for transmitting TxOP configuration information, and if the corresponding field is set to '100', it indicates that CSI-RS 1 is only active. If the corresponding field is set to '011', it indicates that CSI-RS 2 and CSI-RS 3 are active.

3.3.3 CSI-IM Configuration

Hereinafter, a CSI-IM configuration method will be described.

If the number of TPs included in a CoMP set (or CoMP cluster) is N, it is assumed that the number M of CSI-IMs that may be configured in one CoMP set is $(2^N-1)$ and the maximum number of CSI-IMs that may be configured per UE is 3. At this time, per CSI-IM resource, a specific TP may be configured to perform transmission (i.e., ZP-CSI-RS is not configured), and a specific TP may be configured to perform muting (i.e., ZP-CSI-RS is configured).

The following Table 7 illustrates one of methods for configuring CSI-IM configuration when the number of TPs constituting a CoMP set (i.e., CoMP cluster) is 3.

TABLE 7

| CSI-IM ID | TP1 | TP2 | TP3 |
| --- | --- | --- | --- |
| CSI-IM 1 | Muting | Tx | Tx |
| CSI-IM 2 | Muting | Tx | Muting |
| CSI-IM 3 | Muting | Muting | Tx |
| CSI-IM 4 | Muting | Muting | Muting |
| CSI-IM 5 | Tx | Tx | Muting |
| CSI-IM 6 | Tx | Muting | Tx |
| CSI-IM 7 | Tx | Muting | Muting |

In Table 7, CSI-IM ID indicates a mapping relation according DL transmission or muting of TPs which belong to the TxOP duration. At this time, 'Tx' indicates that DL transmission is performed for the TxOP duration, and 'Muting' indicates that the corresponding TP does not perform DL transmission for the TxOP duration. In the embodiments of the present invention, muting means that the corresponding TP does not perform DL transmission at the CSI-IM resource region only allocated to a specific SF and performs DL transmission at the other region of the specific SF. This is to prevent a random WiFi node from transmitting data at the SF at which the TP does not perform DL transmission in the unlicensed band.

As shown in FIG. 15(a), it is assumed that TP3 does not perform Dl transmission for the currently configured TxOP duration because of a busy channel of the TP3. Referring to Table 7, although the TP3 is prescribed to perform transmission at a resource of CSI-IM {1,3,6}, since the TP3 does not try transmission for the currently configured TxOP duration, the UE may regard the resource of CSI-IM {1,3,6} as a CSI-IM resource which is not valid.

Also, referring to Table 7, at a resource of CSI-IM {2,4,5,7}, the TP3 is prescribed to perform muting. Although the TP3 does not try transmission for the corresponding TXOP duration, since unexpected interference may be measured due to channel reservation of WiFi node, etc. in the periphery of the TP3, the UE may also regard the resource of CSI-IM {2,4,5,7} as the CSI-IM resource which is not valid.

Therefore, if there is a TP which does not try transmission within the configured TxOP duration, since all the configured CSI-IM resources may not be valid, the CSI-IM resources may be valid for the TxOP duration for which all TPs belonging to the CoMP set try transmission.

Although Table 8 has been described based on FIG. 15(a), this may equally be applied to the TxOP duration of FIGS. 15(b) and 15(c).

However, if the UE measures interference at the valid CSI-IM resource region only and valid CSI-IM is defined to exist within the TxOP duration for which all TPs belonging to the CoMP set try transmission, CSI-IM resources that enable interference measurement may be very restricted. Therefore, it is required to configure the valid CSI-IM resource in case of Table 7.

In Table 7, CSI-IM {1,3,6} prescribed to be transmitted by the TP3 will be described again. Even though the TP3 does not try transmission because of its busy channel, the corresponding channel may be reserved by WiFi node, etc., and thus cause interference at the resource corresponding to CSI-IM {1,3,6}. Under the assumption that this interference is similar to interference caused when the TP3 performs transmission by reserving the channel, the corresponding CSI-IM resource may be regarded as still valid.

In other words, whether TPs prescribed to perform transmission on a random CSI-IM resource are performing transmission for the corresponding TxOP duration is irrelevant of validity of CSI-IM, and TPs prescribed to perform muting may define that CSI-IM transmitted for the corresponding TxOP duration is only valid. For example, for the TxOP duration configured as shown in FIG. 15(a), CSI-IM 1 is prescribed to perform muting for TP1 only, and may be regarded as valid because the TP1 tries transmission for the corresponding TxOP duration. CSI-IM 2 is prescribed that TP1 and TP3 perform muting, and is not valid because the TP3 does not try transmission for the corresponding TxOP duration. If the same method is applied, it may be configured that CSI-IM {3,6} is valid but CSI-IM {4,5,7} is not valid.

Meanwhile, if a random TP has a channel which is idle but has no data to be transmitted, the corresponding TP may not try Dl transmission for the configured TxOP duration. Particularly, with respect to TP(s) prescribed to perform muting, interference measured by the UE in the case that "the corresponding TP is included in the configured TxOP duration" and interference measured by the UE in the case that "the corresponding TP is not included in the configured TxOP duration because of no data to be transmitted in spite of an idle channel" may be the same as each other.

In other words, with respect to TP(s) prescribed to perform muting, CSI-IM resource is valid for the case that "the corresponding TP is included in the configured TxOP duration" and the case that "the corresponding TP is not included in the configured TxOP duration because of no data to be transmitted in spite of an idle channel", whereas CSI-IM resource may not be valid for the case that "the corresponding TP is not included in the configured TxOP duration because of a busy channel". That is, even though the TP is not included in the TXOP, validity of CSI-IM may be varied depending on whether the channel is idle/busy. To identify this, the serving TP may transmit information indicating whether CoMP sets are idle/busy, to the UE through a DCI format which will transmit TxOP configuration information.

The aforementioned methods are those for determining a valid resource of the configured CSI-IM resources. However, on the current LTE/LTE-A system, information as listed in Table 7 is not transferred to the UE. Therefore, a method for notifying a UE of a valid CSI-IM resource is required.

If it is defined that the CSI-IM resource is valid at the TxOP duration for which all TPs belonging to the CoMP set try transmission, the UE may perform measurement for the CSI-IM resource only when all TPs are configured to join transmission on the TXOP configuration.

For example, if the DCI field (for example, TxOP configuration information) related to CSI-IM configuration is configured by bitmap, the UE may perform measurement for CSI-IM in case of '111' only. To this end, a new parameter may be introduced on the CSI-IM configuration, whereby it may be expressed explicitly that the CSI-IM is valid only if the corresponding DCI field is set to '111'. Alternatively, without introduction of additional parameter, CSI-IM may be defined to be valid only if the corresponding DCI field is set to '111'. The same method may be applied to even the case that the DCI field is configured by 2 bits or 1 bit not the bitmap.

Meanwhile, whether TPs prescribed to perform DL transmission on a random CSI-IM resource are performing transmission for the corresponding TxOP duration is irrelevant of validity of CSI-IM. Also, TPs prescribed to perform muting may define that CSI-IM transmitted for the corresponding TxOP duration is only valid. As listed in Table 7, it is assumed that CSI-IM is configured and TxOP configuration information indicates a transmitting TP, which performs DL transmission within the TxOP duration, by the bitmap. CSI-IM 1 is valid if the corresponding DCI field value is '1XX', CSI-IM 2 is valid if the corresponding DCI field value is '1X1', CSI-IM 3 is valid if the corresponding DCI field value is '11X', and CSI-IM 4 is valid if the corresponding DCI field value is '111'. At this time, 'X' means both 0 and 1.

In other words, a new parameter on the CSI-IM configuration information may be added, whereby the DCI field (or TXOP configuration information), which may be determined to be valid per CSI-IM ID, may be configured. The UE may perform channel measurement at the corresponding CSI-IM only with respect to TXOP for which the DCI field existing on each CSI-IM configuration is received. At this time, the same method may be applied to even the case that the DCI field is configured by 2 bits or 1 bit not the bitmap.

If the TP directly notifies the UE of an active NZP-CSI-RS set at the start of the TxOP duration as described on the CSI-RS configuration, the UE may perform channel measurement for the CSI-IM resource configured for the corresponding NZP-CSI-RS.

Alternatively, the serving TP may directly notify the UE of an active CSI-IM set at the start SF of the TxOP duration, whereby the UE may perform channel measurement for the corresponding CSI-IM resource.

When the active CSI-IM set is directly notified to the UE at the start SF of the TxOP duration, the serving TP may notify the UE of the active CSI-IM set through CSS or USS. If the active CSI-IM set is notified through CSS, the active CSI-IM set may include information on all (or some) of the CSI-IM resources. If the active CSI-IM set is notified through USS, the active CSI-IM set may include only information on CSI-IM resource configured for a specific UE. For example, the information on the CSI-IM resource may be expressed by bitmap, and may indicate that CSI-IM {1,4} is only active in case of '1001000'.

3.3.4 CSI Process Configuration

Hereinafter, a CSI process configuration method will be described.

As described above, each CSI process includes one CSI-RS resource region and one CSI-IM resource region. In more detail, if the number of TPs included in a CoMP set (CoMP cluster) cluster is N, since the number of NZP-CSI-RS is N and the number of CSI-IMs is M(=2^N−1), a total number of CSI processes are N*M. The maximum number of CSI processes that may be configured per specific UE is 4. The following Table 8 illustrates an example of CSI processes configured for a specific UE.

TABLE 8

| CSI process ID | CSI-RS configuration ID | CSI-IM configuration ID |
| --- | --- | --- |
| CSI process 1 | CSI-RS 1 | CSI-IM 1 |
| CSI process 2 | CSI-RS 1 | CSI-IM 2 |
| CSI process 3 | CSI-RS 2 | CSI-IM 3 |
| CSI process 4 | CSI-RS 3 | CSI-IM 4 |

In case of CSI-RS, it may be defined that CSI-RS transmitted from a TP which joins TxOP duration is only valid in the same manner as the aforementioned methods. In case of CSI-IM, it may be defined that all CSI-IMs existing for the TxOP duration are all valid.

For example, if the TxOP duration is configured as shown in FIG. 15(a), CSI-RS 3 may not be valid. That is, CSI-RS 3 that configures CSI process 4 may not be valid. In this way, if either CSI-RS or CSI-IM, which configures CSI process, is not valid, the UE may be configured so as not to perform CSI feedback or channel measurement for the corresponding CSI process, or may be configured to feed an initial value (default value), which is previously defined or configured by higher layer signaling, back.

Alternatively, the UE may perform feedback by assuming channel information (or interference information) measured as a resource which is not valid as a default value which is previously defined or configured by higher layer signaling. For example, if CSI-RS 3 is not valid but CSI-IM 4 is valid in case of CSI process 4, the UE may calculate CQI and feedback the calculated CQI by assuming intensity and spatial properties of a received signal as a default value.

In case of CSI-IM, it may be defined that CSI-IM is valid when all TPs belonging to a CoMP set join TxOP duration for trying transmission as described above. If the TxOP duration is configured as shown in FIG. 15(a), all CSI-IMs may not be valid. For example, CSI-IM 4 as well as CSI-RS 3 that configures CSI process 4 may not be valid. In this way, if both CSI-RS and CSI-IM, which configure CSI process, are not valid, feedback for the corresponding CSI process may not be performed or a default value previously defined or configured by higher layer signaling may be fed back.

However, in another aspect of the present invention, if feedback is varied depending on validity of CSI-RS or CSI-IM, which configures CSI process, it may increase complexity in view of signaling. To solve this, a valid CSI process may previously be configured in accordance with a TP which joins a configured TxOP duration.

For example, the valid CSI process may previously be configured explicitly (for example, on the CSI process configuration information) on the basis of (virtual) cell ID or DCI field value on TXOP configuration as suggested in the CSI-RS configuration method of section 3.3.2 above. Each UE may perform measurement of CSI-RS and CSI-IM resources for the valid CSI process only and feed channel information back.

In still another aspect of the present invention, the serving cell (that is, serving TP) may directly notify the UE of a valid CSI process set at the start SF of the TxOP duration without mapping between CSI process ID of which measurement will be performed by each UE and information as to TPs which join transmission to start the TxOP duration.

When serving TP directly notifies the UE of the valid CSI process set at the start SF of the TxOP duration, the valid CSI process set may be notified to the UE through CSS or USS. If the valid CSI process set is notified through CSS, the valid CSI process set may include information on all (or some) of the CSI processes of the CoMP cluster. If the valid CSI process set is notified through USS, the valid CSI process set may include only information on CSI process configured for a specific UE. For example, the information on the CSI process may be expressed by bitmap, wherein each bit is mapped into CSI process ID. Referring to Table 8, if the corresponding bitmap is set to '0110', it may indicate that CSI-RS 2 and CSI-RS 3 are only valid.

3.3.5 Method for Using Preamble Signal

The methods for indicating a TP which tries transmission for a TxOP duration that has started have been described as above. Hereinafter, instead of the aforementioned methods for configuring TxOP configuration information using DCI, methods for indicating a TP which performs DL transmission within the TxOP duration by using a preamble signal will be described.

If each TP is prescribed to transmit a preamble from a corresponding unlicensed band at the start SF of the TxOP duration and a different preamble is used for each TP, each UE may identify a TP that has started transmission by detecting a preamble at the start SF of the TxOP duration. For example, if a preamble sequence may be configured by modification of a synchronization signal (for example, PSS and/or SSS) and/or modification of a reference signal (for example, CRS (cell specific reference signal), respective sequence IDs different from each other may be used for each TP. At this time, corresponding sequence ID may be mapped into CSI-RS configuration, CSI-IM configuration and CSI process configuration, whereby the CSI-RS configuration, CSI-IM configuration and/or CSI process configuration mapped with the sequence ID of the corresponding synchronization signal may be acquired if the UE detects the corresponding synchronization signal and may be used for channel measurement later.

With respect to the methods described in section 3.3 above, each UE may disregard whether a TP which is not allocated to each UE as a UE specific TP set is performing transmission for the TxOP duration, from CSI measurement operation within the corresponding TxOP. For example, it is assumed that CoMP sets allocated to UE1 are TP 1, TP 2, and TP 3 and CoMP sets allocated to UE2 are TP 1 and TP 2. In this case, UE2 may perform CSI measurement regardless of the fact whether the TP3 currently performs transmission for the TxOP duration. For example, it may be assumed that a bitmap value is set to 3 bits, and the first bit of 3 bits indicates whether transmission of TP1 has been performed and the second and third bits indicate whether transmission of TP2 and TP3 has been performed. At this time, UE2 may perform CSI measurement regardless of the third bit value related to transmission of TP3.

Also, information as to application of the aforementioned methods and/or information on rules of the aforementioned methods may be notified from the eNB to the UE through signaling (e.g., physical layer signal or higher layer signal) which is previously defined.

3.3.6 DMTC Duration

The same methods as the embodiments disclosed in sections 3.3.1 or 3.3.5 above may be applied to even the case of channel measurement and report for the CSI-RS and the CSI-IM, which configure a discovery reference signal (DRS) within a discovery measurement timing configuration (DMTC) duration configured to allow a small cell to discover its neighboring small cells in a small cell environment.

3.4 Method for Measuring and Transmitting CSI

Hereinafter, a method for measuring and transmitting CSI will be described.

Figure 16:
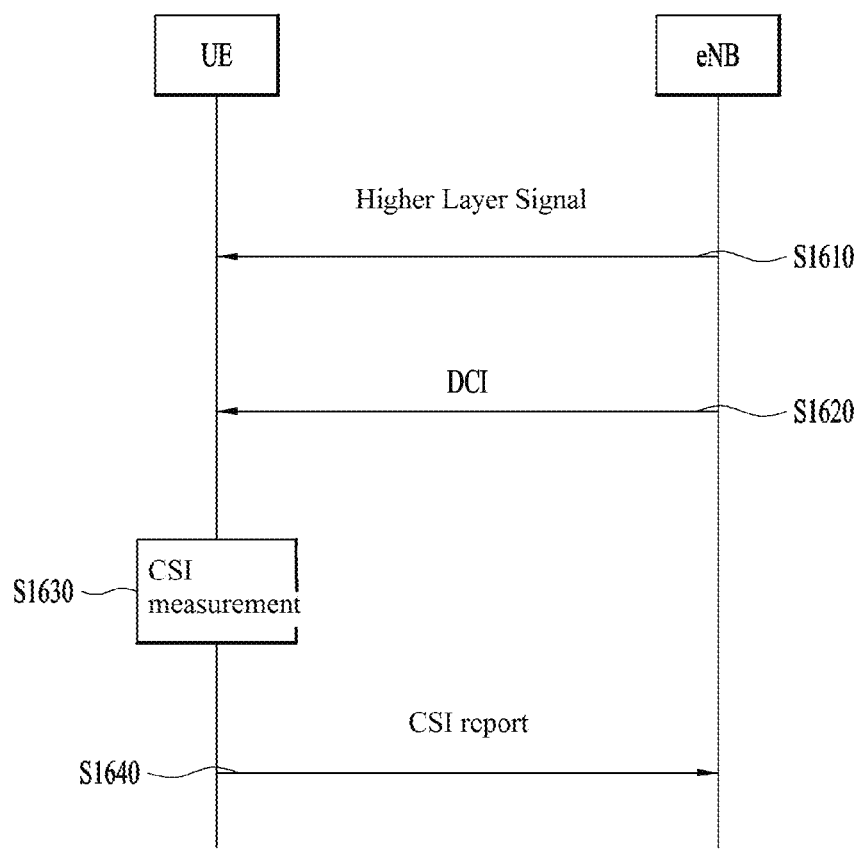
FIG. 16 is a view illustrating a method for measuring and reporting CSI for TPs included in a TxOP duration, among TPs included in a CoMP set.

FIG. 16 is a view illustrating a method for measuring and reporting CSI for TPs included in a TxOP duration, among TPs included in a CoMP set.

Although one eNB and one UE are shown in FIG. 16, the example of FIG. 16 may equally be applied to a plurality of eNBs and a plurality of UEs. Also, the eNB which manages a serving cell is representatively shown in FIG. 16, and an eNB or serving cell, which belongs to a CoMP set and/or carrier aggregation, is not shown for convenience of description. Also, the eNB may be used to refer to the aforementioned TP.

Referring to FIG. 16, the eNB (that is, TP) may transmit CSI process configuration information, CSI-RS configuration information and/or CSI-IM configuration information to the UE through a higher layer signal. Also, the eNB may further transmit information on the number M of subframes, which configure the TxOP duration, and usage of the corresponding TxOP duration through a higher layer signal (S1610).

In step S1610, description of the CSI process configuration information, the CSI-RS configuration information and/or the CSI-IM configuration information may be understood with reference to the description in sections 2, 3.2 and 3.3 above. If the UE receives the higher layer signal in step S1610, the UE may identify configuration information of a TxOP duration, which will be configured later, and CSI process configuration information, CSI RS configuration information and/or CSI-IM configuration information for TPs which belong to the corresponding TxOP duration.

If the TxOP duration is configured as shown in FIG. 15(a), the eNB may transmit DCI, which includes TxOP configuration information, to the UE at the first subframe of the TxOP duration. If the TxOP duration is configured as shown in FIG. 15(b) or 15(c), the eNB (that is, serving TP) may transmit DCI, which includes TxOP configuration information on TPs varied per subframe at which the TPs which belong to the TxOP duration are varied, to the UE at the first subframe of the TxOP duration. At this time, the TxOP configuration information may be understood with reference to the description in section 3.3 above (S1620).

The TxOP configuration information may indicate TPs, which will perform DL transmission for the TxOP duration, among TPs which belong to the CoMP set. At this time, the TxOP configuration information may be mapped into the CSI process configuration information, the CSI-RS configuration information and/or the CSI-IM configuration information to indicate validity or invalidity of the CSI process configuration information, the CSI-RS configuration information and/or the CSI-IM configuration information. Therefore, the UE may identify validity or invalidity of a CSI-RS resource and/or a CSI-IM resource, which is transmitted from the TPs within the TxOP duration, on the basis of the information received in step S1610 and the information received in step S1620, and may measure channel information on the basis of the valid CSI-RS and/or CSI-IM. That is, the UE may calculate the CSI and transmit the calculated CSI to the eNB (S1630 and S1640).

In another aspect of this embodiment, the TxOP configuration information transmitted in step S1620 may not be mapped into the CSI process configuration information, the CSI-RS configuration information and/or the CSI-IM configuration information. In this case, the eNB may notify the UE of validity or invalidity of the CSI process configuration information, the CSI-RS configuration information and/or the CSI-IM configuration information at each subframe by using DCI. Details of this notification will be understood with reference to section 3.3 above.

In FIG. 16, the UE may be located at the cell edge. With respect to this UE, if a neighboring cell is idle even in the case that the serving TP is busy, the neighboring cell may provide data transmission and reception services for the corresponding UE in the same manner as a CoMP DPS method. Also, if the neighboring cell is idle even though the serving TP is not busy, the CoMP set may be configured to perform DL transmission, whereby data transmission throughput may be improved.

Also, the eNB and/or the UE should configure the TxOP duration for data transmission in the unlicensed band. At this time, the TxOP duration may be configured even though all TPs within the CoMP set are not active.

For example, the TxOP duration may be configured to start only if all TPs within the CoMP set are active. Alternatively, the TxOP duration may be configured to start even in the case that all TPs within the CoMP set are not active.

At this time, the TxOP duration may be configured depending on whether its start timing and/or end timing is synchronized between the TPs within the CoMP set.

For example, the TxOP duration may be configured such that its start timing and/or end timing is synchronized between the TPs within the CoMP set. Alternatively, the TxOP duration may be configured even though its start timing and/or end timing is not synchronized between the TPs within the CoMP set.

For CoMP set configuration, channel information from neighboring TPs should be fed back to the serving TP. To this end, the UE should perform channel measurement for the neighboring TPs. Therefore, the UE should know a TP which joins DL transmission for the TxOP duration configured for channel measurement.

Particularly, in case of the CSI-RS, since it is difficult to periodically the CSI-RS in view of properties of the LTE-U system, the serving TP should aperiodically notify the UE of a corresponding TP, which transmits the CSI-RS, during the TxOP duration. At this time, in case of the CSI-IM, with respect to an interference TP comprised of ZP-CSI-RS, different interferences may be measured for the case that the corresponding TP is included in TxOP and the case that the corresponding TP is not included in TxOP.

Therefore, the eNB needs to notify the UE of a TP which performs DL transmission during the TxOP duration, among TPs which belong to the CoMP set. To this end, the eNB may notify the UE of a TP, which performs DL transmission during the TxOP duration, through the TxOP configuration information included in DCI. The TxOP configuration information may be expressed by bitmap mode or predetermined bits.

The CSI-RS configuration may indicate a mapping relation between information as to TP(s) which belong(s) to the CoMP set and is(are) configured to start the TxOP duration, and the CSI-RS resource of which measurement should be performed by the UE. At this time, the CSI-RS configuration may be configured based on virtual cell ID or TxOP scheduling DCI field. If the CSI-RS configuration is configured based on TxOP scheduling DCI field, the CSI-RS configuration may be mapped into the TxOP configuration information. Alternatively, the eNB may directly notify the UE of the active (that is, valid) CSI_RS set through the DCI.

The CSI-IM configuration may indicate validity or invalidity of the CSI-IM resource.

For example, the CSI-IM configuration may be configured to be valid only if all TPs within the CoMP set perform DL transmission for the TxOP duration.

Alternatively, whether TPs prescribed to perform transmission on a random CSI-IM resource are performing transmission for the corresponding TxOP duration is irrelevant of validity of the CSI-IM, and TPs prescribed to perform muting may define that CSI-IM transmitted for the corresponding TxOP duration is only valid.

Or, the CSI-IM resource mapped into the CSI-RS resource directly indicated by the eNB through DCI may be defined as valid.

Or, the eNB may configure that the CSI-IM resource for a TP indicated by the TxOP configuration information is valid, by mapping the CSI-IM resource into the TxOP configuration information, similarly to the CSI-RS configuration method.

The CSI process configuration may indicate a CSI feedback method when one of the CSI-RS and the CSI-IM, which configure the CSI process, is valid. Alternatively, the CSI process configuration may indicate a CSI feedback method when both the CSI-RS and the CSI-IM, which configure the CSI process, are not valid.

This CSI process configuration may be mapped into the TxOP configuration information to indicate whether the CSI-RS resource and/or the CSI-IM resource for each CSI process is valid. That is, the eNB may indicate validity of the CSI-RS and CSI-IM resources for the TPs, which perform actual DL transmission for the TxOP duration, by semi-statically allocating the CSI process configuration and dynamically transmitting the TxOP configuration information.

Alternatively, the eNB may directly transmit validity or invalidity of the CSI process configuration to the UE through the DCI field.

In the embodiments of the present invention, each TP may transmit a preamble per start subframe of each TxOP duration to indicate the start of the TxOP duration.

In this case, a different preamble may be used per TP, whereby the eNB may replace the TxOP configuration information. That is, preamble sequences which configure different preambles per TP may be mapped into the CSI process configuration information, the CSI-RS configuration information, and/or the CSI-IM configuration information to indicate that the CSI-RS/IM resource mapped into the preamble received by the UE is only valid.

Figure 18:
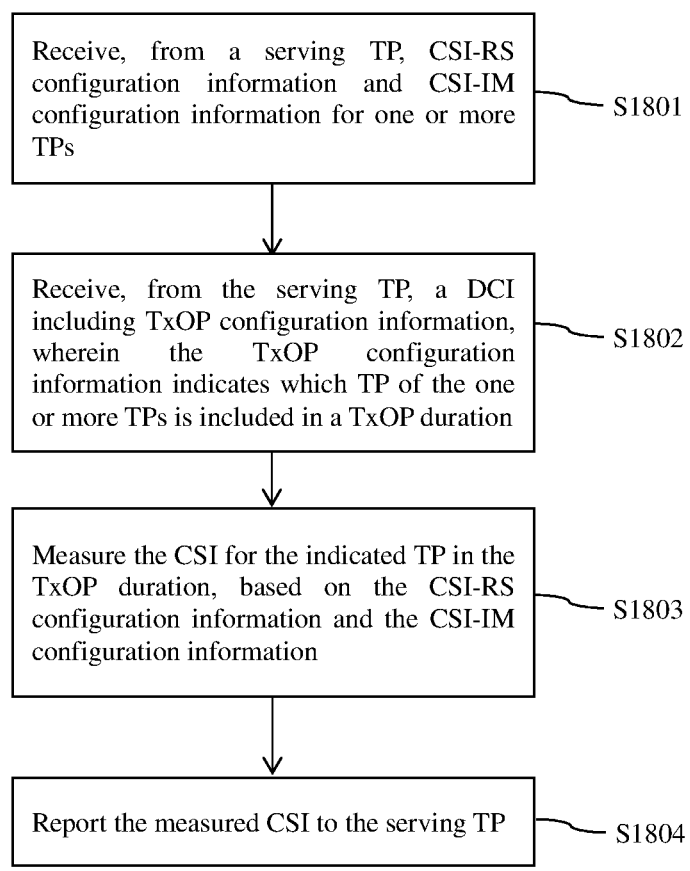
FIG. 18 illustrates a method according to an embodiment of the invention.

FIG. 18 shows a method for reporting channel state information (CSI) by a user equipment (UE) in a wireless access system supporting an unlicensed band. The method includes: receiving, from a serving transmission point (TP), channel state information-reference signal (CSI-RS) configuration information and channel state information-reference measurement (CSI-IM) configuration information for one or more TPs (S1801); receiving, from the serving TP, a downlink control information (DCI) including transmission opportunity (TxOP) configuration information, wherein the TxOP configuration information indicates which TP of the one or more TPs is included in a TxOP duration (S1802); measuring the CSI for the indicated TP in the TxOP duration based on the CSI-RS configuration information and the CSI-IM configuration information (S1803); and reporting the measured CSI to the serving TP (S1804).

4. Apparatuses

Figure 17:
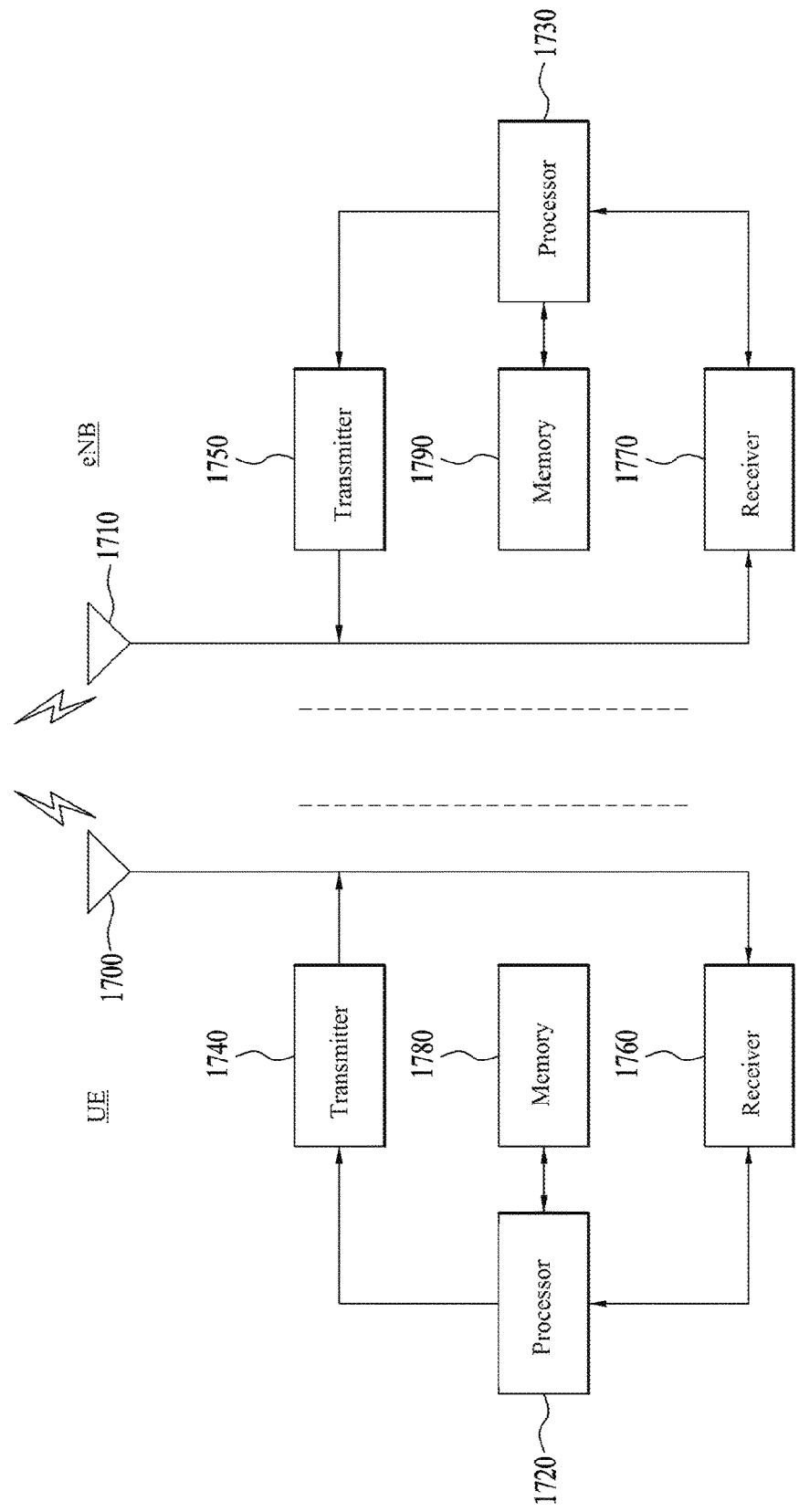
FIG. 17 illustrates a device through which methods described in FIGS. 1 to 16 can be implemented.

Apparatuses illustrated in FIG. 17 are means that can implement the methods described before with reference to FIGS. 1 to 16.

A UE may act as a transmission end on a UL and as a reception end on a DL. An eNB may act as a reception end on a UL and as a transmission end on a DL.

That is, each of the UE and the eNB may include a Transmitter (Tx) 1740 or 1750 and a Receiver (Rx) 1760 or 1770, for controlling transmission and reception of information, data, and/or messages, and an antenna 1700 or 1710 for transmitting and receiving information, data, and/or messages.

Each of the UE and the eNB may further include a processor 1720 or 1730 for implementing the afore-described embodiments of the present disclosure and a memory 1780 or 1790 for temporarily or permanently storing operations of the processor 1720 or 1730.

The embodiments of the present invention may be performed using the aforementioned components and functions of the UE and eNB. For example, the processor of the eNB may identify whether an SCell is idle by performing backoff and CS, and may transmit and receive data by configuring a TxOP duration in case of the idle state. The eNB may reserve the corresponding SCell by transmitting a reservation signal to a duration prior to the TxOP duration. Various methods for configuring the TxOP duration may be understood with reference to the embodiments of the present invention disclosed in the aforementioned sections 1 to 3 above.

Also, the processor of the eNB may transmit CSI process configuration information, CSI-RS configuration information and/or CSI-IM configuration information, which is applied to the configured TxOP duration, to the UE through a higher layer signal. Also, the processor of the eNB may transmit DCI, which includes TxOP configuration information indicating information on TPs which belong to the TxOP duration, through (E)PDCCH. That is, the CSI process configuration information, the CSI-RS configuration information, and/or the CSI-IM configuration information may be configured semistatically through the higher layer signal, and the TxOP configuration information may be configured dynamically through the physical layer signal, whereby the eNB may transmit data adaptively in accordance with a configuration type of the TxOP configuration information. Also, the processor of the UE may measure and report CSI based on the higher layer signal and DCI, which are received from the eNB. Details of this operation will be understood with reference to the description of sections 1 to 3 above.

The Tx and Rx of the UE and the eNB may perform a packet modulation/demodulation function for data transmission, a high-speed packet channel coding function, OFDM packet scheduling, TDD packet scheduling, and/or channelization. Each of the UE and the eNB of FIG. 17 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1780 or 1790 and executed by the processor 1720 or 1730. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for reporting channel state information (CSI) by a user equipment (UE) in a wireless access system supporting an unlicensed band, the method comprising:
receiving, from a serving transmission point (TP), channel state information-reference signal (CSI-RS) configuration information and channel state information-interference measurement (CSI-IM) configuration information for one or more TPs;
receiving, from the serving TP, a downlink control information (DCI) including transmission opportunity (TxOP) configuration information,
wherein the TxOP configuration information indicates which TP of the one or more TPs is included in a TxOP duration;
measuring the CSI for the indicated TP in the TxOP duration based on the CSI-RS configuration information and the CSI-IM configuration information; and
reporting the measured CSI to the serving TP.

2. The method according to claim 1, wherein the CSI-RS configuration information includes information for scheduling CSI-RS resources, and the CSI-IM configuration information includes information for scheduling CSI-IM resources.

3. The method according to claim 2, wherein the DCI further includes a field indicating a mapping relation between information as to whether the TxOP duration has started and the CSI-RS resources.

4. The method according to claim 2, wherein the DCI further includes a field indicating validity or invalidity of the CSI-IM resources for the TxOP duration.

5. The method according to claim 1, wherein the TxOP configuration information is mapped into at least the CSI-RS configuration information or the CSI-IM configuration information to indicate validity or invalidity of at least the CSI-RS configuration information or the CSI-IM configuration information.

6. A user equipment (UE) for reporting channel state information (CSI) in a wireless access system supporting an un unlicensed band, the UE comprising:
   a transmitter;
   a receiver; and
   a processor functionally connected with the transmitter and the receiver and configured to measure and report the CSI,
   wherein the processor is configured to:
      receive, from a serving transmission point (TP), channel state information-reference signal (CSI-RS) configuration information and channel state information-interference measurement (CSI-IM) configuration information for one or more transmission points TPs,
      receive from the serving TP, a downlink control information (DCI) including transmission opportunity (TxOP) configuration information,
      wherein the TxOP configuration information indicates which TP of the one or more TPs is included in a TxOP duration,
      measure the CSI for the indicated TP in the TxOP duration, based on the CSI-RS configuration information and the CSI-IM configuration information, and
      report the measured CSI to the serving TP.

7. The UE according to claim 6, wherein the CSI-RS configuration information includes information for scheduling CSI-RS resources, and the CSI-IM configuration information includes information for scheduling CSI-IM resources.

8. The UE according to claim 7, wherein the DCI further includes a field indicating a mapping relation between information as to whether the TxOP duration has started and the CSI-RS resources.

9. The UE according to claim 7, wherein the DCI further includes a field indicating validity or invalidity of the CSI-IM resources for the TxOP duration.

10. The UE according to claim 6, wherein the TxOP configuration information is mapped into at least the CSI-RS configuration information or the CSI-IM configuration information to indicate validity or invalidity of at least the CSI-RS configuration information or the CSI-IM configuration information.

* * * * *